United States Patent
Phillips

(10) Patent No.: US 7,883,060 B2
(45) Date of Patent: Feb. 8, 2011

(54) APPARATUS AND METHOD FOR TWISTING A WING TO INCREASE LIFT ON AIRCRAFT AND OTHER VEHICLES

(75) Inventor: Warren F. Phillips, Paradise, UT (US)

(73) Assignee: Utah State University, North Logan, UT (US)

( * ) Notice: Subject to any disclaimer, the term of this patent is extended or adjusted under 35 U.S.C. 154(b) by 764 days.

(21) Appl. No.: 11/805,226

(22) Filed: May 21, 2007

(65) Prior Publication Data
US 2008/0149779 A1    Jun. 26, 2008

Related U.S. Application Data

(60) Provisional application No. 60/875,070, filed on Dec. 14, 2006.

(51) Int. Cl.
*B64C 3/14* (2006.01)
*B64C 3/44* (2006.01)
*B64C 3/52* (2006.01)

(52) U.S. Cl. .................................. 244/203; 244/219
(58) Field of Classification Search ............... 244/198, 244/201, 203, 219, 46, 99.11, 99.8, 123.1
See application file for complete search history.

(56) References Cited

U.S. PATENT DOCUMENTS

| | | | |
|---|---|---|---|
| 2,043,275 A | 6/1936 | Weick | |
| 2,418,273 A | 4/1947 | Moore | |
| 2,614,774 A | 10/1952 | Donovan | |
| 3,576,301 A | 4/1971 | Stickle | |
| 3,617,018 A | 11/1971 | Baetke | |
| 3,698,664 A | 10/1972 | Bonney | |
| 3,721,406 A | 3/1973 | Hurlbert | |
| 4,445,655 A | 5/1984 | Hueberger | |
| 4,460,138 A | 7/1984 | Sankrithi | |
| 4,485,992 A * | 12/1984 | Rao | 244/90 R |
| 4,614,320 A | 9/1986 | Rutan | |
| 4,854,528 A | 8/1989 | Hofrichter | |
| 4,892,274 A | 1/1990 | Pohl et al. | |

(Continued)

FOREIGN PATENT DOCUMENTS

JP    4-63799    2/1992

(Continued)

OTHER PUBLICATIONS

Anderson, "Charts for Determining the Pitching Moment of Tapered Wings with Sweepback and Twist," National Advisory Committee for Aeronautics, TN-483, Dec. 1933.

(Continued)

*Primary Examiner*—Tien Dinh
*Assistant Examiner*—Richard R Green

(57) ABSTRACT

A method and apparatus for varying the twist of a wing such that induced drag is minimized or reduced during cruise and lift is maximized or increased at least during takeoff and landings. In addition, variations in the twist may produce yawing and rolling moments. The twist amount is varied pursuant to the operating conditions, including those parameters used to determine the lift coefficient. The twist for reducing induced drag and/or improving lift may be employed by geometric or aerodynamic twist, including full span control surfaces used to provide roll control, high-lift and reduced induced drag. The twist may also be employed by twisting just a portion of the wing or the entire wing, either geometrically or aerodynamically.

76 Claims, 14 Drawing Sheets

U.S. PATENT DOCUMENTS

| | | | |
|---|---|---|---|
| 4,892,460 A | | 1/1990 | Volk |
| 5,082,207 A * | | 1/1992 | Tulinius ..................... 244/203 |
| 5,167,383 A | | 12/1992 | Nozaki |
| 5,529,458 A * | | 6/1996 | Humpherson ............... 244/219 |
| 5,551,651 A | | 9/1996 | Hendrickson |
| 5,681,014 A | | 10/1997 | Palmer |
| 5,794,893 A | | 8/1998 | Diller et al. |
| 5,836,550 A | | 11/1998 | Paez |
| 5,992,792 A | | 11/1999 | Arnason |
| 6,079,672 A | | 6/2000 | Lam et al. |
| 6,089,503 A | | 7/2000 | Volk |
| 6,145,791 A | | 11/2000 | Diller et al. |
| 6,349,903 B2 | | 2/2002 | Caton et al. |
| 6,535,158 B2 | | 3/2003 | Wilkerson et al. |
| 6,554,229 B1 | | 4/2003 | Lam et al. |
| 6,641,089 B2 | | 11/2003 | Schwetzler et al. |
| 6,970,773 B2 | | 11/2005 | Phillips |
| 2001/0006207 A1 | | 7/2001 | Caton et al. |
| 2003/0057332 A1 | | 3/2003 | Schwetzler et al. |
| 2003/0197097 A1* | | 10/2003 | Wakayama ................ 244/215 |
| 2005/0151029 A1* | | 7/2005 | Tracy et al. ................ 244/215 |
| 2005/0224662 A1* | | 10/2005 | Lacy et al. ................. 244/214 |

OTHER PUBLICATIONS

Anderson, "Determination of the Characteristics of Tapered Wings," National Advisory Committee for Aeronautics, TR-572, May 1937.

Cohen, "A Method for Determining the Camber and Twist of a Surface to Support a Given Distribution of Lift," National Advisory Committee for Aeronautics, TN-855, Aug. 1942.

Datwyler, "Calculations on the Effect of Wing Twist on the Air Forces Acting on a Monoplane Wing," National Advistory Committee for Aeronautics, TN-520, Mar. 1935.

De Young et al., "Theoretical Symmetric Span Loading at Subsonic Speeds for Wings Having Arbitrary Plan Form," National Advisory Committee for Aeronautics, TR-921, Dec. 1948.

Falkner et al, "The Calculation of Aerodynamic Loading on Surfaces of Any Shape," Reports and Memoranda 1910, Aeronautical Resarch Council, London, Aug. 1943.

Filotas, "Solution of the Lifting Line Equation for Twisted Elliptic Wings," 8 (10)J. Aircraft, pp. 835-836, Oct. 1971.

Glauert, "Theoretical Relationships for an Aerofoil with Hinged Flap," Reports and Memoranda 1095, Aeronautical Research Council, Longdon, Jul. 1927.

Glauert et al., "The Characteristics of a Tapered and Twisted Wing with Sweep-Back," Reports and Memoranda 1226, Aeronautical Research Council, London, Aug. 1929.

Glauert, "The Monoplane Aerofoil," The Elements of Aerofoil and Airscrew Theory, Cambridge University Press, Cambridge, UK, pp. 137-155, 1926.

Hartshorn, "Theoretical Relationship for a Wing with Unbalanced Ailerons," Reports and Memorandum 1259, Aeronautical Research Council, London, Apr. 1929.

Munk, "On the Distribution of Lift Along the Span of an Airfoil with Displaced Ailerons," National Advisory Committee for Aeronautics, TN-195, Jun. 1924.

Munk, "A New Relation between the Induced Yawing Moment and the Rolling Moment of an Airfoil in Straight Motion," National Advisory Committee for Aeronautics, TR-197, Jun. 1925.

Pearson, "Theoretical Span Loading and Moments of Tapered Wings Producted by Aileron Deflection," National Advisory Committee for Aeronautics, TN-589, Jan. 1937.

Pearson et al., "Theoretical Stability and Control Characteristics of Wings with Various Amounts of Taper and Twist," National Advisory Committee for Aeronautics, TR-635, Apr. 1937.

Pearson, "Span Load Distribution for Tapered Wings with Partial-Span Flaps," National Advisory Committee for Aeronautics, TR-585, Nov. 1937.

Phillips, "Lifting-Line Analysis for Twisted Wings and Washout-Optimized Wings," American Institute of Aeronautics and Astronautics, AIAA-2003-0393, Jan. 2003.

Phillips, "Lifting-Line Analysis for the Effects of Washout on Performance and Stability," 40(6) Journal of Aircraft, Nov.-Dec. 2003.

Phillips et al., "Lifting-Line Analysis of Roll Control and Variable Twist," American Institute of Aeronautics and Astronautics, AIAA-2003-4061, Jun. 2003.

Phillips et al., "Lifting-Line Analysis of Roll Control and Variable Twist," 41(2) Journal of Aircraft, pp. 1-11, Mar. 2004.

Stevens, "Theoretical Basic Span Loading Characteristics of Wings with Arbitrary Sweep, Aspect Ratio, and Taper Ratio," National Advisory Committee for Aeronautics, TN-1772, Dec. 1948.

* cited by examiner

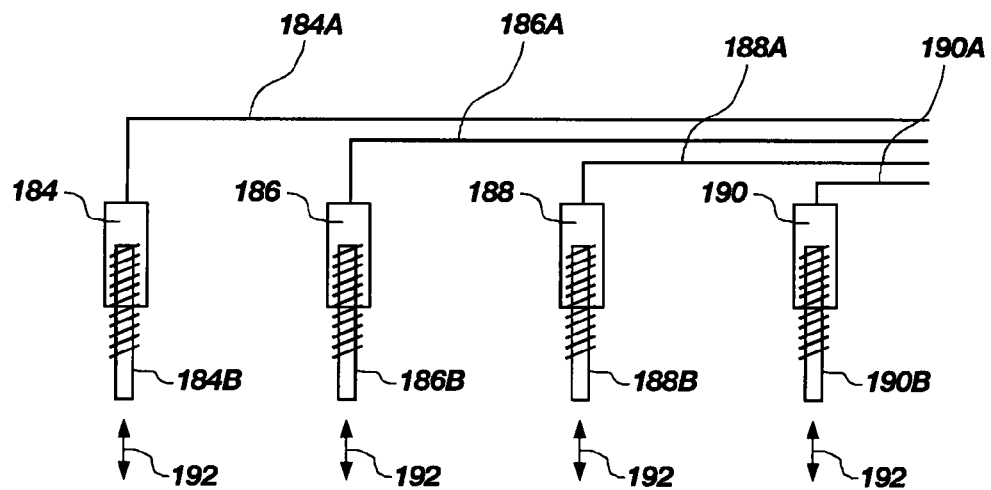
FIG. 12
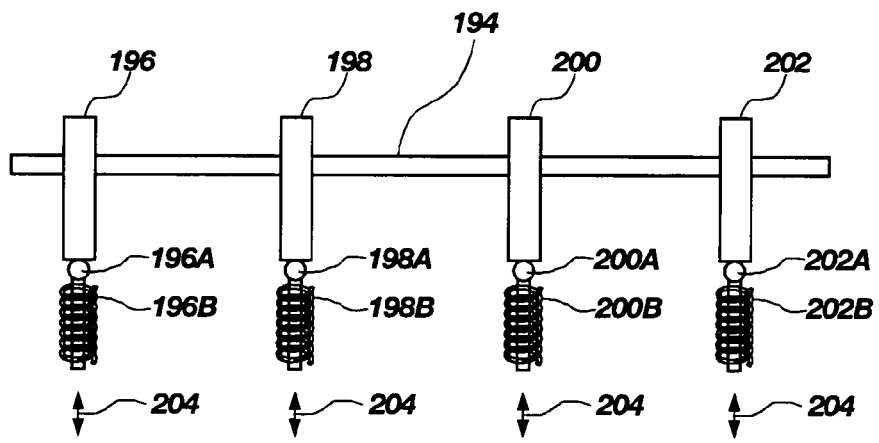
FIG. 13
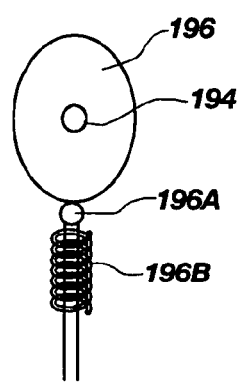 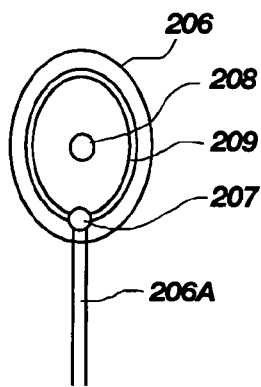
FIG. 14  FIG. 15

APPARATUS AND METHOD FOR TWISTING A WING TO INCREASE LIFT ON AIRCRAFT AND OTHER VEHICLES

CROSS-REFERENCE TO RELATED APPLICATIONS

This application claims the benefit of U.S. Provisional Application No. 60/875,070, filed Dec. 14, 2006, which is hereby incorporated by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

STATEMENT REGARDING FEDERALLY SPONSORED RESEARCH OR DEVELOPMENT

Not Applicable.

BACKGROUND

1. The Field of the Disclosure

The present disclosure relates generally to airfoils or watercraft structures, and more particularly, but not necessarily entirely, to airfoils utilizing a twist distribution to optimize lift.

2. Description of Related Art

Some important differences between the concepts of induced drag and lift are set forth below.

A. Induced Drag

Induced drag is caused by the generation of lift by a wing and is parallel to the relative wind into which the wing is flying. When a wing flies at the zero lift angle of attack there is no lift and therefore no induced drag. Conversely, when the angle of attack increases the wing produces more lift, therefore there is more induced drag. The magnitude of the induced drag depends on (1) the amount of lift being generated by the wing; and (2) on the shape and size of the wing, also known as wing planform. As might be expected, induced drag is undesirable while flying in that it results in diminished fuel economy as well as decreased airspeed. Induced drag also contributes to the stall characteristics of a given wing.

The prior art teaches various features that may be incorporated into a wing in order to reduce induced drag at high angles of attack. One of the more well known ways to reduce induced drag is to increase the wingspan. For example, this would include aircraft such as gliders, as well as high altitude spy planes such as the U2. It also includes to a lesser degree modern jet airliners. However, as the span is increased, the wing structural weight also increases and at some point the weight increase offsets the induced drag savings.

Another previously known method for reducing induced drag is to employ end plates onto the tips of the wings. The end plates served to block some of the vortices causing reduced drag. However, end plates are not employed widely due to their relative inefficiencies. Still another method for reducing drag is using winglets. Other known attempts to reduce induced drag include wings with slotted edges and wings with fanned partial wings.

Tapered wings are also commonly used as a means for reducing induced drag. It can be shown that tapered wings with the right amount of taper have a lower reduced drag than an untapered wing. However, this reduction comes at a price. A tapered wing tends to stall first at in the region near the wingtips. This wingtip stall can lead to poor handling characteristics during stall recovery. Thus, tapered wings have commonly been used as a compromise solution.

Around the 1920s it was found that a flat elliptical shaped wing gave a uniform air deflection along the entire span, which minimized the induced drag. Elliptical shaped wings were used on the British SuperMarine Spitfire, a popular WWII fighter, to reduce induced drag. In fact, it can be shown that an elliptical wing produces the minimum possible induced drag for all angles of attack. Unfortunately, there are several problems with elliptical wings. First, elliptical shaped wings are cost prohibitive. While this barrier is less important today than it once was, provided that the designer is willing to use modern composite materials. However, making an elliptical shape out of aluminum is quite difficult and therefore expensive. Next, elliptical wings have undesirable stall characteristics. It is much safer to design an airplane so that the wing stalls first at the root, leaving the outer portion of the wing, (where the ailerons are) still flying. An elliptical wing however, will tend to stall uniformly all along the span creating a potentially dangerous situation for the pilot. Finally, other factors dictate a wings ideal shape more than the desire to reduce induced drag. The tapered wing, for instance, is lighter and easier to build, factors which outweigh the advantages of an elliptical wing's ability to reduce induced drag.

Another popular method of reducing induced drag is to design a wing with washout, also referred to herein as twist or wing twist. Washout may be applied to wings so that the outboard section of the wing does not stall first. When an aircraft may be increasing its angle of attack, i.e. increasing the lift of the wing, the airflow over the wing eventually reaches a point where it becomes separated, causing a loss in lift. By twisting the front outboard portion of the wing down, the lift and induced drag in that area may be decreased and the stall may be delayed in that area. By maintaining lift on the outboard portion of the wing, the pilot may be still able to maintain roll control of the aircraft in the event of a stall on other portions of the wing.

Conventionally, washout may be incorporated into a wing using geometric twist and aerodynamic twist. The use of washout in the prior art, however, may be characterized by two major shortcomings. First, since the amount of twist may be integrated into a wing at the time of construction, usually for a design lift coefficient, the twist in a wing may only be optimized, if at all, for one portion of the expected flight envelope. Second, washout comes at a price. A wing with washout experiences a decrease in lift performance due to the reduction in the angle of attack.

B. Lift

Lift is the force that is perpendicular to the direction of flight. For example, lift operates to oppose the weight of an aircraft and hold the aircraft in the air as well as other functions, such as turning and maneuvering the aircraft. Lift is a mechanical aerodynamic force produced by the motion of the airplane through the air. Lift is generated by every part of the aircraft, but most of the lift on a conventional aircraft is generated by the wings.

There are several factors which affect the magnitude of lift. Lift depends on the density of the air, the square of the velocity, the air's viscosity and compressibility, the surface area over which the air flows, the shape of the body, and the body's inclination to the flow. In general, the dependence on body shape, inclination, air viscosity, and compressibility is very complex and difficult to calculate. One way to deal with these complex dependencies is to characterize the dependence by a single variable. For lift, this variable is called the lift coefficient. This allows aircraft designers to collect all the effects, simple and complex, into the single lift equation below:

$$L = \frac{C_L \times S_w \times V^2 \times \rho}{2}$$

In the above equation, $C_L$ is the coefficient of lift, $\rho$ is the density of air (air density is calculated here as a function of temperature and pressure), V is the velocity or airspeed, $S_W$ is the surface area of the lifting surface, and L is the lift force produced. For given air conditions, shape, and inclination of the object, one has to determine a value for $C_L$ to determine the lift. For some simple flow conditions and geometries and low inclinations, aerodynamicists can determine the value of $C_L$ mathematically. But, in general, the lift coefficient parameter, $C_L$, is determined experimentally using wind tunnels. In addition, various values of $C_L$ for different air foil sections are published in reference tables. In short, it can be understood that the lift coefficient is a parameter associated with a particular shape of an airfoil, and is incorporated in the lift equation to predict the lift force generated by a wing using this particular cross section.

During takeoff and landing of an aircraft, it is desirable that the lift of the aircraft is maximized while maintaining as low as possible velocity for safety reasons. In the past, one way to increase lift while keeping a relatively low velocity was to deploy wing flaps. Wing flaps are a movable part of the wing, normally hinged to the trailing edge (rear edge) of each wing closest to the airplane body. The pilot extends and retracts the flaps. Extending the flaps increases the wing camber and the angle of attack of the wing. This increases wing lift and also increases drag. Flaps enable the pilot to make a steeper descent when landing without increasing airspeed. They also help the airplane get off the ground in a short distance. There are many different types of flaps. Some hinge, some slide, some open with slots, and some help smooth the air over the wing even when high angles of attack are flown during landing.

In addition to flaps, slats may be used to increase lift. Slats are protrusions from the leading edge (front edge) of a wing. They add to the lift of a wing. Slats and flaps work together to maintain laminar flow (a smooth airflow) over the top of the wing. When cruising at a desired altitude, flaps and slats are retracted to minimize drag. While flaps and slats have been effectively employed in the past, flaps and slats do not necessarily obtain the maximum total possible lift for a wing of a given design.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which:

FIG. 12 is a break-away schematic view of an additional embodiment of a variable-twist control system for twisting a control surface using threaded engagement;

FIG. 13 is a break-away schematic view of a further embodiment of a variable-twist control system for twisting a control surface using a rotating shaft;

FIG. 14 is a break-away schematic end view of the variable-twist control system of FIG. 12, using a cam;

FIG. 15 is a break-away schematic end view of an alternative variable-twist control system of FIG. 12 using a pin and groove mechanism;

DETAILED DESCRIPTION

Figure 1A:
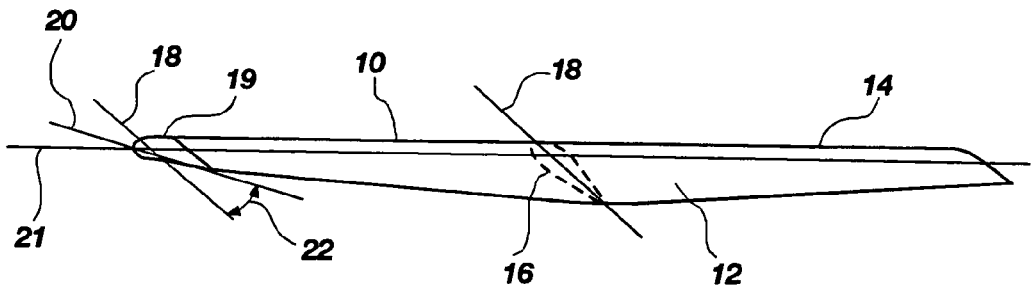
FIG. 1A is a perspective view of an aircraft wing.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supercedes said reference materials. The reference materials discussed herein are provided solely for their disclosure prior to the filing date of the present application. Nothing herein is to be construed as a suggestion or admission that the inventor is not entitled to antedate such disclosure by virtue of prior disclosure, or to distinguish the present disclosure from the subject matter disclosed in the reference materials.

The following publications are hereby incorporated by reference herein in their entireties: W. F. Phillips, *Lifting-Line Analysis for Twisted Wings and Washout Optimized Wings*, Journal of Aircraft, Vol. 41, No. 1, January-February 2004, pages 128-136; W. F. Phillips, N. R. Alley, and W. D. Goodrich, *Lifting-Line Analysis of Roll Control and Variable Twist*, AIAA Journal of Aircraft, Vol. 41, No. 5, pp. 1169-1176 (October 2004).; Anderson, J. D., *Fundamentals of Aerodynamics*, 3rd ed., McGraw-Hill, New York, 2001; Bertin, J. J., *Aerodynamics for Engineers*, 4th ed., Prentice-Hall, Upper Saddle River, New Jersey, 2002; Karamcheti, K., *Ideal-Fluid Aerodynamics*, Wiley, New York, 1966; Katz, J., and Plotkin, A., *Low-speed Aerodynamics*, 2nd ed., Cambridge University Press, Cambridge, UK, 2001; Kuethe, A. M., and Chow, C. Y., *Foundations of Aerodynamics*, 5th ed., Wiley, New York, 1998; McCormick, B. W., Aerodynamics, *Aeronautics, and Flight Mechanics*, 2nd ed. Wiley, New York, 1995; and Phillips, W. F., *Mechanics of Flight*, Wiley, New York, 2004.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein the term "geometric twist" means a variation in the local geometric angle of attack. Geometric twist may be the rotation of the outboard airfoil sections of a wing relative to the root airfoil section.

As used herein the term "aerodynamic twist" means a variation in the local zero-lift angle of attack. Aerodynamic twist may be the bending of the outboard airfoil sections of a wing relative to the root airfoil section.

As used herein, the terms "washout," "twist," and "wing twist" mean geometric and/or aerodynamic twist, either separately or in combination, for reasons that are explained further below. To avoid repeated use of the lengthy and cumbersome phrase "geometric and aerodynamic twist," the words "washout," "twist," and "wing twist" will be used synonymously to indicate a full or partial spanwise variation in either the local geometric angle of attack (geometric twist) or the local zero-lift angle of attack (aerodynamic twist). Thus, the terms "washout," "twist," and "wing twist" may be used interchangeably and refer to both aerodynamic twist or geometric twist, except if otherwise specified.

As used herein, the term "wing twist distribution" or "twist distribution" means the distribution of wing twist, either geometric, aerodynamic, or both, along the span of a wing.

As used herein, the term "optimum twist distribution" means a non-dimensional wing twist distribution that can be applied to a wing such that the wing has the induced drag at the same minimum level as an elliptic wing having the same aspect ratio and no washout.

As used herein, the term "optimum twist amount" means the amount of twist calculated from the lift coefficient to be applied, either geometrically or aerodynamically, pursuant to the optimum twist distribution. Optimum twist amount may depend on, among other things, one, some or all of the parameters defining the lift coefficient. Typically, the optimum twist amount changes during flight in correlation to changes in the lift coefficient.

As used herein, the term "optimum twist" for a wing means an optimum twist amount applied in the optimum twist distribution using geometric or aerodynamic twist, either separately or in combination. Typically, the optimum twist will vary during a flight pursuant to variations in the optimum twist amount. The optimum twist may be applied wholly or partially to any wing to improve the amount of reduced drag.

As used herein, the term "planform" means the shape and layout of an airplane's wing as is known by those skilled in the art. While the wing planform is usually, but not necessarily, fixed for any particular airplane, it should be noted that the present disclosure may be used with most any planform.

As used herein, the term "wingspan" refers to the total span of the wing measured from wingtip to wingtip.

As used herein, the term "wing" refers broadly to any lift-inducing structure that engages fluid flow to help provide lift or buoyancy, with the understanding that the term "fluid" refers to both gases and liquids. Such lift-inducing structure may be a part of an aircraft such as an airfoil, or a part of a watercraft such as a rudder, or a part of any other vehicle that utilizes lift or buoyancy to operate.

Table 1, below, comprises a list of nomenclature used by the applicant in the present disclosure.

TABLE 1

| | |
|---|---|
| b = | wingspan |
| b/2 = | wing semispan |

TABLE 1-continued

| | |
|---|---|
| $C_L =$ | wing lift coefficient |
| $\tilde{c}_L =$ | airfoil section lift coefficient |
| $\tilde{C}_{L,\alpha} =$ | airfoil section lift slope |
| $C_{L,\alpha} =$ | wing lift slope |
| $\tilde{c}_{Ld} =$ | design or target section lift coefficient distribution |
| $c =$ | local airfoil section chord length |
| $c_f =$ | local flap chord length |
| $c_{Tip} =$ | tip chord length |
| $c_{Root} =$ | root chord length |
| $\tilde{L} =$ | section lift (lift per unit length at a given location (lb/foot)) |
| $L =$ | wing lift |
| $n =$ | load factor |
| $R_T =$ | wing taper ratio |
| $R_A =$ | wing aspect ratio, $b^2/S$ |
| $S_w =$ | wing planform area |
| $V =$ | airplane airspeed |
| $W =$ | airplane weight |
| $\delta_t =$ | total or maximum flap twist angle, washout positive |
| $\epsilon_f =$ | local airfoil section flap effectiveness |
| $\theta =$ | change of variables for the spanwise coordinate and is equal to $\cos^{-1}(-2z/b)$ |
| $\rho =$ | air density |
| $\Omega_{OPT} =$ | optimum total twist angle amount, geometric plus aerodynamic, washout positive |
| $\Omega =$ | total twist angle amount, geometric plus aerodynamic, washout positive |
| $\omega =$ | spanwise symmetric twist distribution function |
| $z =$ | spanwise distance from root section |
| $\kappa_{D\Omega} =$ | washout contribution to the induced drag factor |
| $\kappa_{DL} =$ | lift washout contribution to induced drag factor |

Relationship Between Lift and Induced Drag

Applicant has discovered that lift can be maximized in an airplane or other aircraft, by twisting the wing of the aircraft in a particular way, with a particular twist distribution along the wing. There is a relationship between maximum lift, and induced drag, which can be summarized by noting that induced drag increases as maximum lift increases, and vice versa.

Accordingly, a discussion of induced drag follows, and is interspersed by concepts relating to the maximization of lift.

Induced drag can be minimized for a wing, if wing twist may be related to an optimum twist distribution and an optimum twist amount. Applicant has further discovered that induced drag can be minimized over a range of operating conditions encountered during flight by continuously optimizing the twist of a wing based upon the operating conditions and an optimum twist distribution. The optimized twist for a wing may be continuously updated by varying the geometric twist or aerodynamic twist, either separately or in combination, during a flight. Thus, the wing may be maintained at an optimum twist during flight for the entire flight envelope to reduce induced drag.

This is an improvement over integrating the twist permanently into a wing at the time of manufacture as previously done for a specific design lift coefficient. Instead, the wing may be optimized for a wide range of lift coefficients. Other benefits to optimizing the twist of a wing may include reduction in the pitching moment produced by the wing, which can improve trim requirements and maneuverability, as well as alternation of the downwash induced on an aft tail by the main wing, which can reduce drag and improve trim requirements and maneuverability. Applicant was granted U.S. Pat. No. 6,970,773 on Nov. 29, 2005 on an Apparatus and Method for Reducing Induced Drag on Aircraft and Other Vehicles (hereinafter "the '773 Patent"). The '773 Patent is hereby incorporated by reference in its entirety.

Since the issuance of his '773 Patent, Applicant has further discovered that any desired or target lift distribution along the span of an unswept wing of any planform can be implemented by applying the appropriate twist distribution. An unswept wing is a wing that does not extend backward from the fuselage at an angle. Where the maximum attainable airfoil section lift coefficient is constrained to be uniform over the wingspan, then a maximum wing lift coefficient can be achieved. Thus, it is possible to predict and implement the twist distribution that will maximize the wing lift coefficient for any wing geometry. In one embodiment of the present disclosure, during takeoff and landing, a variable-twist control system may be used to maximize the wing lift coefficient to thereby provide lower air speeds for shorter takeoff/landing distances and greater safety. A variable-twist control system is able to vary the wing twist on a wing during operation. This may include varying either the twist distribution on the wing, the amount of twist applied to the wing, or both.

Referring now to the figures. FIGS. 1A-1F are illustrative of the prior art as well as of principles needed by an uninitiated reader to understand the present disclosure. It should be noted that FIGS. 1A-1F should not be construed as limiting in any way on the present disclosure, but instead should be referred to as general background to the present disclosure.

Referring now to FIG. 1A, there is shown an example of a wing 10 having a fixed geometric twist. Wing 10 comprises a leading edge 14 and a trailing edge 12. Geometric twist, also referred to as geometric washout, can be measured by angle 22 formed by the intersection of the root chord line 18 of the root section 16 (shown with dashed lines) with the tip chord line 20 of the tip section 19. The chord of an airfoil is the imaginary straight line drawn through the wing 10 from its leading edge 14 to its trailing edge 12.

As can be observed, the geometric twist lessens the local geometric angle of attack into the relative wind thereby decreasing the amount of lift in that local area. In other words, the tip section 19 may have a lower angle of attack than the root section 16 to delay stall at the tip section 19. The wing 10 may be twisted around the quarter chord line 21 or fixed point. The twist incorporated into wing 10 may be fixed and cannot be varied in distribution or amount.

Figure 1B:
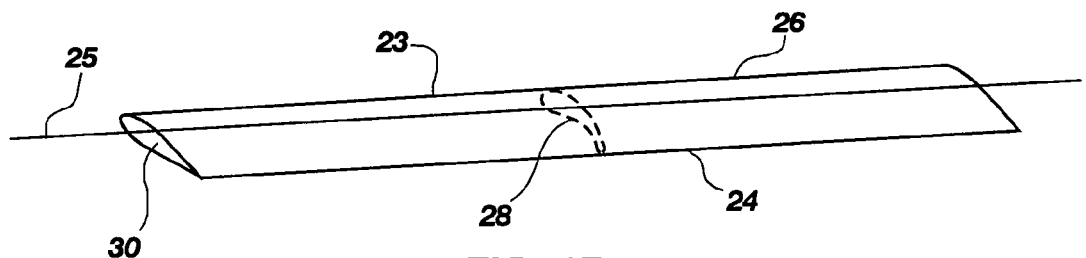
FIG. 1B is a perspective view an alternative embodiment of an aircraft wing.

Aerodynamic twist, also referred to as aerodynamic washout, is illustrated in FIG. 1B on wing 23 having a leading edge 26 and a trailing edge 28. For aerodynamic twist, the tip section 30 has a different camber than the root section 28. In other words, the tip section 30 has a different cross-sectional shape than the root section 28. In practice, aerodynamic twist varies the local zero-lift angle of attack to delay stalling in at the tip section 30. This is primarily due to the fact that the tip section 30 will produce less lift than the root section 28. In wing 23, the aerodynamic twist, the change in camber, may be fixed into the wing at the time of manufacture and cannot be varied. It is to be understood that a change of camber can be physically accomplished in accordance with structures and methods for changing camber known to those having ordinary skill in the relevant field pertaining to changes in camber.

Figure 1C:
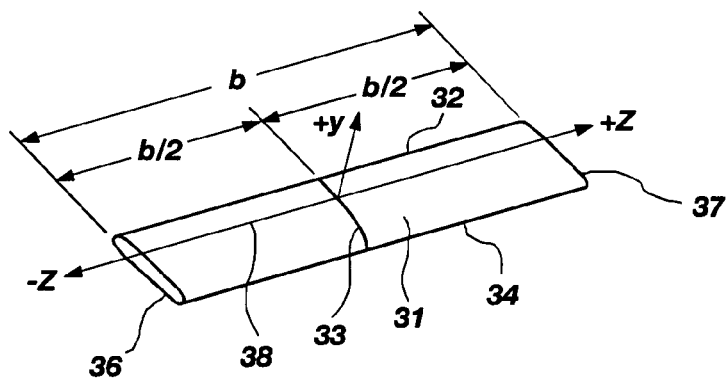
FIG. 1C is a perspective view of an aircraft wing showing a coordinate system.
Figure 1D:
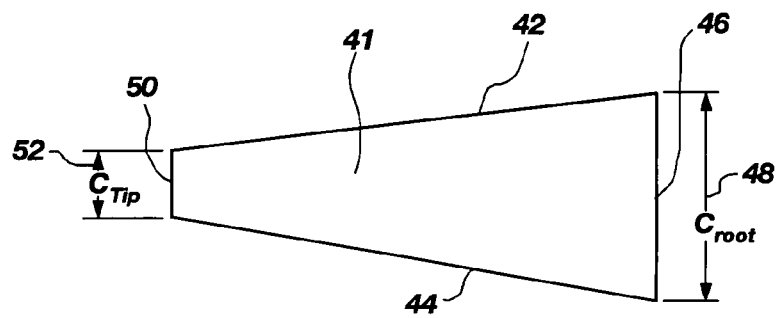
FIG. 1D is a plan view of a further embodiment of an aircraft wing.
Figure 1E:
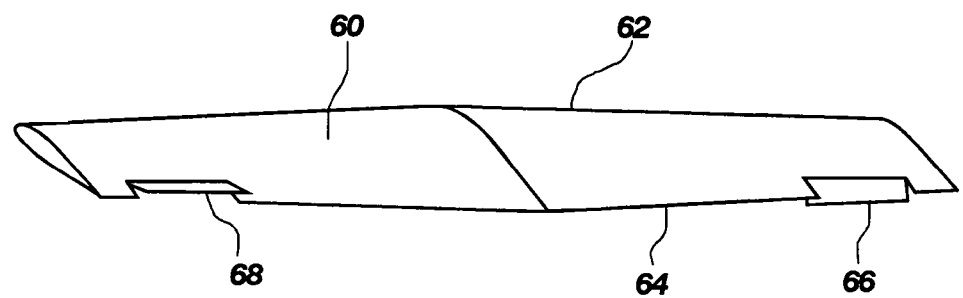
FIG. 1E is a perspective view an additional alternative embodiment of an aircraft wing.
Figure 1F:
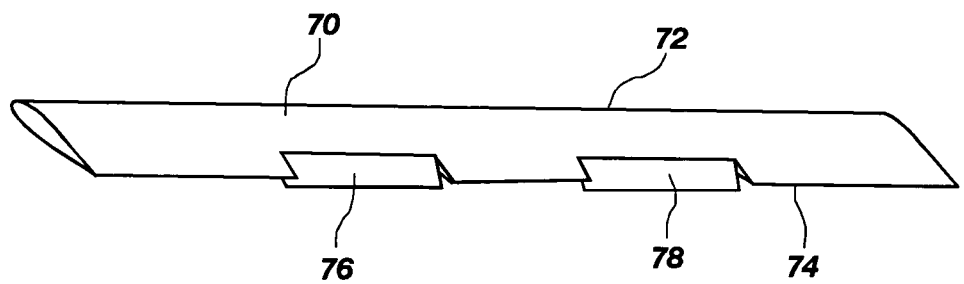
FIG. 1F is a perspective view another alternative embodiment of an aircraft wing.

Aerodynamic twist is also illustrated in FIGS. 1E and 1F for a typical wing by means of a deflection of a control surface as is known in the prior art as a flap deflection. Wing 60 having a leading edge 62 and trailing edge 64 in FIG. 1E illustrates a local zero-lift angle of attack variation as a result of asymmetric deflection of ailerons 66 and 68. Wing 70 having a leading edge 72 and trailing edge 74 in FIG. 1F illustrates a variation in the local zero-lift angle of attack variation as flaps 76 and 78. Significantly, it will be noted from both FIGS. 1E and 1F that the aerodynamic twist from the deflection may be constant both in amount and distribution across the control surfaces, i.e. ailerons 68 and 66 and flaps 76 and 78. It should also be noted that this holds true for a wing with both flaps and ailerons. Simply understood, the deflection in the control surfaces changes the cross sectional shape of a wing thereby resulting in the aerodynamic twist. Pure geometric twist on the other hand, does not change the cross sectional shape but instead rotates the entire section around a fixed point.

As mentioned previously, wing twist can be accomplished by geometric twist and/or aerodynamic twist, either separately or in combination to obtain the same washout. The amount of flap deflection or camber-line deformation that may be equivalent to a given amount of geometric twist can be determined from any of several well-known methods, which are commonly used in the field of aerodynamics. These include but are not limited to classical thin airfoil theory, conformal mapping of potential flow solutions using complex variables, vortex panel codes, and with or without boundary layer corrections. These methods are discussed and explained in widely available aeronautical engineering textbooks and will not be discussed further here.

Coordinate system 38 shown on wing 31 in FIG. 1C represents one commonly used by those skilled in the art. The coordinate system 38 may be centered on the root 33, between the leading edge 32 and the trailing edge 34. The y-axis extends in the vertical direction and the z-axis extends in the horizontal or spanwise direction, i.e. towards the wing tips, 36 and 37. The span of the entire wing is b, while each wing semispan is b/2 as can be readily ascertained from FIG. 1C.

Referring now to FIG. 1D, there is shown a tapered wing 41 having a leading edge 42 and a trailing edge 44. Wing taper ratio, $R_T$, is defined by $c_{Tip}/c_{Root}$ where $c_{Tip}$ is the length of the tip chord 50, represented by the double arrow marked with reference numeral 52, and $c_{Root}$ is the length of the root chord 46, represented by the double arrow marked with the reference numeral 48. The function c(z) means the length of a chord at any point z along the span of wing 41.

Figure 1G:
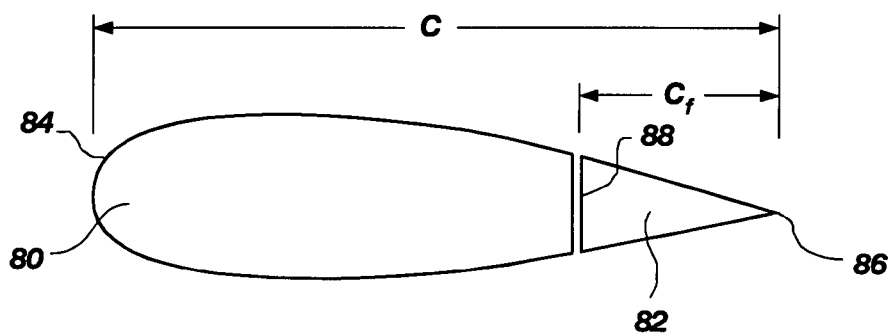
FIG. 1G is a cross-sectional view of an aircraft wing.

FIG. 1G illustrates how to determine flap ratio, $c_f/c$, for a wing 80 having a flap 82. The local chord length c is measured from the leading edge 84 to the trailing edge 86. The local flap chord length $c_f$ is measured from the front edge of the flap to the trailing edge 86. It should be recognized that for the special case where the entire wing can act a flap, then the flap ratio is one (1).

Figure 1H:
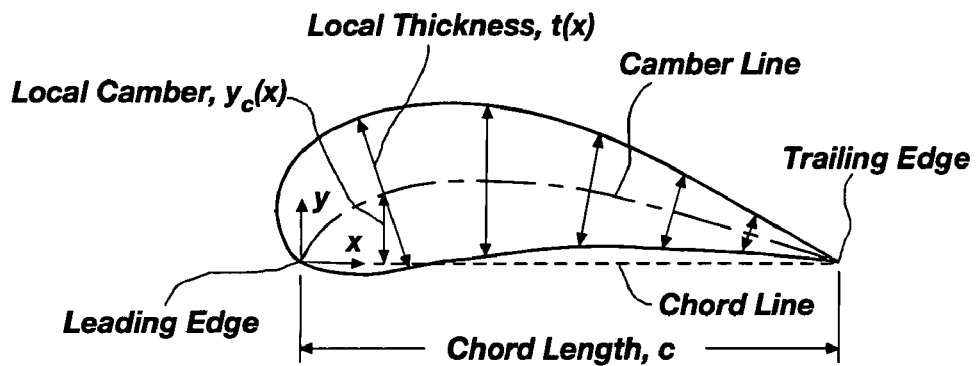
FIG. 1H is an exaggerated, out of proportion illustration of an airfoil cross section.

Referring now to FIG. 1H, an airfoil is any two dimensional cross-section of a wing or other lifting surface that lies in a plane perpendicular to the spanwise coordinate. An airfoil section is completely defined by the geometric shape of its boundary. However, the aerodynamic properties of an airfoil section are most profoundly affected by the shape of its centerline. This centerline is midway between the upper and lower surfaces of the airfoil and is called the camber line. If the airfoil is not symmetric, the camber line is not a straight line but rather a planar curve.

Because the shape of the camber line is such an important factor in airfoil design, it is critical that it be understood exactly how the camber line is defined. The following nomenclature is as it applies to airfoil geometry such as that shown in FIG. 1H.

The "camber line" is the locus of points midway between the upper and lower surfaces of an airfoil section as measured perpendicular to the camber line itself.

The "leading edge" is the most forward point on the camber line. The leading edge cannot readily be seen or identified by inspection with an unaided human eye in airfoil drawings that are to scale, and as such, FIG. 1H is shown as an exaggerated, out of proportion illustration.

The "trailing edge" is the most rearward point on the camber line.

The "chord line" is a straight line connecting the leading edge and the trailing edge.

The "chord length," often referred to simply as the "chord," is the distance between the leading edge and the trailing edge as measured along the chord line.

The "maximum camber," often referred to simply as the "camber," is the maximum distance between the chord line and the camber line as measured perpendicular to the chord line.

The "local thickness," at any point along the chord line, is the distance between the upper and lower surfaces as measured perpendicular to the camber line.

The "maximum thickness," often referred to simply as the "thickness," is the maximum distance between the upper and lower surfaces as measured perpendicular to the camber line.

The "upper and lower surface coordinates" for an airfoil can be obtained explicitly from the camber line geometry, $Y_c(x)$, and the thickness distribution t(x), in which:

$$x_u(x) = x - \frac{t(x)}{2\sqrt{1 + (dy_c/dx)^2}} \frac{dy_c}{dx}$$

$$y_u(x) = y_c(x) + \frac{t(x)}{2\sqrt{1 + (dy_c/dx)^2}}$$

$$x_l(x) = x + \frac{t(x)}{2\sqrt{1 + (dy_c/dx)^2}} \frac{dy_c}{dx}$$

$$y_l(x) = y_c(x) - \frac{t(x)}{2\sqrt{1 + (dy_c/dx)^2}}$$

With these basic principles in mind, we can now turn to the present disclosure.

As mentioned above, an elliptic wing without any washout generates the minimum induced drag of any known wing planform for any aspect ratio and any lift coefficient.

In general, the optimum twist distribution for a given wing planform may be computed from $$\omega(z) = 1 - \frac{\sqrt{1 - (2z/b)^2}}{c(z)/c_{root}}$$

or $$\omega(\theta) = 1 - \frac{\sin(\theta)}{c(\theta)/c_{root}}$$

where $$\theta = \cos^{-1}(-2z/b)$$

then the induced drag generated by a non-elliptic wing may be minimized to that of an elliptic wing. For the special case of a tapered wing, the optimum twist distribution function may be simplified to:

$$\omega(z) = 1 - \frac{\sqrt{1 - (2z/b)^2}}{1 - (1 - R_T)|2z/b|}$$

Figure 2:
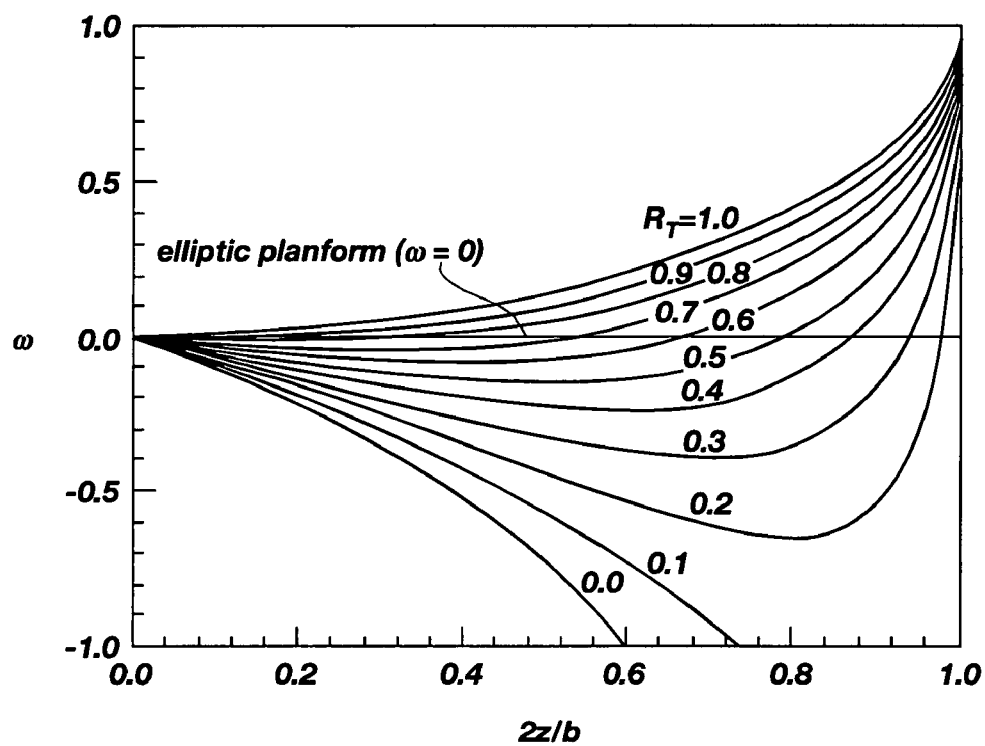
FIG. 2 is a chart depicting twist distributions.

The optimized washout distribution according to the above equation(s) is shown in the graph illustrated in FIG. 2 for several values of taper ratio, $R_T$, between 0 and 1. For each of the taper ratios, $R_T$, a different distribution may be required. It should be noted that the optimized twist distribution shown in FIG. 2 is normalized and non-dimensional and therefore can be applied to a wing of any given length and for any given twist amount by simple scalar multiplication. As might be expected, the optimized twist distribution for an elliptic planform is zero (0).

In general, the optimized twist amount may be determined from $$\Omega_{opt} = \frac{\kappa_{DL} C_L}{2\kappa_{D\Omega} C_{L,\alpha}}$$

or $$\Omega_{opt} = \frac{4bC_L}{\pi R_A \tilde{C}_{L,\alpha} c_{root}}$$

or for constant chord full-span trailing edge flaps the optimum twist is given by $$(\delta_t)_{opt} = \frac{\kappa_{DL} C_L}{2\kappa_{D\Omega} C_{L,\alpha} \varepsilon_f}$$

where $$\kappa_{DL} \equiv 2\frac{b_1}{a_1}\sum_{n=2}^{\infty} n \frac{a_n}{a_1}\left(\frac{b_n}{b_1} - \frac{a_n}{a_1}\right)$$

$$\kappa_{D\Omega} \equiv \left(\frac{b_1}{a_1}\right)^2 \sum_{n=2}^{\infty} n\left(\frac{b_n}{b_1} - \frac{a_n}{a_1}\right)^2$$

$$C_{L,\alpha} = \pi R_A a_1$$

the coefficients $a_n$ and $b_n$ being computed from $$\sum_{n=1}^{\infty} a_n \left[\frac{4b}{\tilde{C}_{L,\alpha} c(\theta)} + \frac{n}{\sin(\theta)}\right] \sin(n\theta) = 1$$

$$\sum_{n=1}^{\infty} b_n \left[\frac{4b}{\tilde{C}_{L,\alpha} c(\theta)} + \frac{n}{\sin(\theta)}\right] \sin(n\theta) = \omega(\theta)$$

The solution $a_n$ is commonly referred to as the Fourier series solution to Prandtl's classical lifting-line equation. The only unknowns in that equation are the Fourier coefficients, $a_n$. Historically, these coefficients have usually been evaluated from collocation methods. Typically, the series may be truncated to a finite number of terms and the coefficients in the finite series are evaluated by equation to be satisfied at a number of spanwise locations equal to the number of terms in the series.

Other methods of solution have also been developed and are discussed and explained in widely available aeronautical engineering textbooks. Any of the methods commonly used to obtain a solution to $a_n$ can be used to obtain the Fourier coefficients, $b_n$. While the solutions for $a_n$ have been known since the mid 1920s, the optimized equations for twist distribution and twist amount were recently developed by applicant, albeit in the context of a fixed twist distribution. These equations can be used to obtain the optimum geometric twist and/or the optimum aerodynamic twist, which could be implemented by either method or a combination of both.

For the special case of a tapered or rectangular wing, when the present disclosure may be put into practice using either geometric twist or aerodynamic twist, the optimum twist amount formula given above can be greatly simplified. For the special case of a tapered or rectangular wing having full span flaps of constant effectiveness, the optimum total amount of flap twist may be computed from:

$$(\delta_t)_{opt} = \frac{2(1 + R_T)C_L}{\pi \tilde{C}_{L,\alpha} \varepsilon_f}$$

where $R_T$ is the taper ratio, $C_L$ is the lift coefficient, $\varepsilon_f$ is the local airfoil section flap effectiveness, and $\tilde{C}_{L,\alpha}$ is equal to the airfoil section lift slope.

It should be noted that the airfoil section lift slope may be typically given a value of $2\pi$ with good results. However, it should be understood that other values of the airfoil section lift slope may be used. This may include actual values resulting from actual test results, computer simulation, known equations or yet to be known equations. It should be understood that the value of the airfoil section lift slope may only be an approximation of the true value.

$\varepsilon_f$, the local airfoil section flap effectiveness, may likewise be determined from actual test results, computer simulation, known equations or yet to be known equations. One such presently known equation may be $$\varepsilon_f = 1 - \frac{\theta_f - \sin\theta_f}{\pi}$$

where $$\theta_f = \cos^{-1}(2c_f/c)$$

and where $c_f$ is the chord length of the flap and c is the entire chord length (see FIG. 1G). For the special case where the entire wing twists, $\varepsilon_f$ is equal to one (1) thereby reducing the equation to $$\Omega_{opt} = \frac{2(1 + R_T)C_L}{\pi \tilde{C}_{L,\alpha}}$$

The wing lift coefficient, $C_L$, can vary widely over the allowable flight envelope. For this reason, it is advantageous to be able to vary wing twist interactively during flight in direct response to the lift coefficient or any of its individual parameters, either separately or in combination. The lift coefficient may be defined as $$C_L = \frac{Wn}{\frac{1}{2}\rho V^2 S_w}$$

where W is the aircraft weight, n is load factor or "g-factor" associated with the normal acceleration of the airplane during a maneuver, $\rho$ is the air density, V is the airspeed, and $S_W$ is the wing area. The aircraft weight multiplied by the load factor is generally equal to the lift. These parameters may be referred to individually or collectively as operating conditions.

It should be noted that any mechanism used to interactively vary wing twist (geometric or aerodynamic) as a function of the parameters that affect the lift coefficient fall within the scope of the present disclosure. Each of the individual parameters of the lift coefficient will be described in more detail below.

The airplane's weight, W, which varies during flight as a result of fuel burn and other factors such as the dropping of a payload, accessories, or armament. The instantaneous aircraft weight can be determined from fuel gauges and other sensors available to a flight computer. The wing twist would then be interactively varied as a function of airplane weight as determined from such sensors.

The load factor, n, which varies during flight whenever the airplane is being maneuvered. This may be particularly important for fighter aircraft which are designed to perform very rapid maneuvers, which can produce load factors as large as 9 or 10 g. The instantaneous load factor can be determined from accelerometers and other sensors available to a flight computer. The wing twist would then be interactively varied as a function of airplane load factor as determined from such sensors.

The air density, $\rho$, which varies during flight as a result of changes in altitude, barometric pressure, and temperature. The instantaneous air density can be determined from altimeters, pressure gauges, temperature gauges, and other sensors available to a flight computer. The wing twist would then be interactively varied as a function of the air density as determined from such sensors.

The airplane's airspeed, V, which varies considerably between takeoff or landing speeds and cruise or maximum flight speed. The instantaneous airspeed can be determined from an airspeed indicator or other such sensor available to a flight computer. The wing twist would then be interactively varied as a function of airspeed as determined from such sensors.

The airplane's wing area, $S_W$, which may be typically fixed during flight. However, some airplanes do have variable wing geometry. In such aircraft, wing twist could also be interactively varied as a function of wing area.

Maximum Lift

In addition to finding a twist distribution to minimize induced drag, the present disclosure is able to predict the twist distribution that will produce any desired airfoil section lift coefficient distribution along the span of an unswept wing of any given planform. The present disclosure further is able to predict the twist distribution that maximizes the wing lift coefficient to its design maximum, while keeping the total amount of required twist at a practical level.

It has been previously known that a maximum lift coefficient and an airfoil section lift coefficient distribution for a particular airplane wing can be derived responsive to the geometry of the wing. However, previous to the present disclosure, it was unknown how a wing in operation would achieve the maximum possible lift across all sections of a span of the wing at the same time without sacrificing other design considerations. That is, while some sections of a wing are able to reach their maximum lift potential, other sections of the wing may not be producing their maximum possible lift, and hence, those sections of the wing go underutilized. As the lift generated on the underutilized sections of the wing increases, the sections that have already reached their potential may begin to stall. It was previously unknown how to obtain the maximum possible lift across a span of a wing, prior to the present disclosure without sacrificing other performance factors.

Using the present disclosure, applicant has found that it is possible to calculate a twist distribution required to maintain an airfoil section lift coefficient distribution across the span of a wing that either approximates or equals a desired or target airfoil section lift coefficient distribution. The wing lift coefficient, $C_L$, is defined as $$C_L = \frac{L}{1/2\rho V^2 S_w}$$

The section lift coefficient distribution, $\tilde{c}_L$, is defined as $$\tilde{C}_L(z) = \frac{\tilde{L}(z)}{1/2\rho V^2 c(z)}$$

The desired or target airfoil section lift coefficient distribution may be a maximum distribution to achieve the maximum possible lift across a span of a wing. In the case where the desired or target airfoil section lift coefficient is a maximum distribution, the desired or target airfoil section lift coefficient distribution can be determined from the geometry of the wing. However, it will be appreciated that the desired or target airfoil section lift coefficient distribution may by any distribution that will improve flight performance. That is, the present disclosure is not limited to the manner in which the desired or target airfoil section lift coefficient distribution is calculated, determined or found.

Once the required twist distribution has been calculated, the twist distribution may be implemented into a wing using a variable-twist control system, as disclosed herein, to maintain, as closely as possible, the desired or target airfoil section lift coefficient distribution. It will be appreciated that it may be mechanically impossible or otherwise undesirable to fully implement a twist distribution that exactly achieves the desired or target airfoil section lift coefficient distribution during wing operation. It is sufficient, under the present disclosure, that the twist distribution maintain an airfoil section lift coefficient distribution that either approximates or equals the desired or target airfoil section lift coefficient distribution. In one embodiment, the error between the actual airfoil section lift coefficient distribution and the desired or target lift coefficient distribution is within about 33% of each other. Usually this error is less than 33%, many times, this error is less than 25%, and often times this error is less than 10%. It will be appreciated that any attempt to impose a desired or target airfoil lift coefficient distribution onto a wing during operation falls within the scope of the present disclosure.

Likewise, it will be appreciated by those skilled in the art, that it may be mechanically impossible or otherwise undesirable to fully implement the calculated twist distribution. Thus, it will be understood that the concepts of "applying" or "implementing" the twist distribution pursuant to present disclosure, means applying or implementing the twist distribution as far as is mechanically feasible and it is not required that the calculated twist distribution be actually implemented 100% in a wing. It is enough under the present disclosure that one attempt to apply or implement the twist distribution under the concepts of "applying" or "implementing" a twist distribution. In one embodiment, the actual twist distribution imposed on a wing is within about 33% of the calculated twist distribution required to maximize lift. Usually this error is less than 33%; many times, this error is less than 25%; and often times this error is less than 10%. It will be appreciated that any attempt to impose a calculated twist distribution onto a wing during operation falls within the scope of the present disclosure.

In one embodiment, the equation to determine the twist distribution for any desired or target section lift distribution may be $$\omega(\theta) = \frac{F(\pi/2) - F(\theta)}{F(\pi/2) - F(0)}$$

where $$F(\theta) = \sum_{n=1}^{\infty} w_n \left[ \frac{4b}{\tilde{C}_{L,\alpha} c(\theta)} + \frac{n}{\sin(\theta)} \right] \sin(n\theta)$$

$$w_n = \frac{1}{2\pi} \int_{\theta=0}^{\pi} \frac{c(\theta) \tilde{C}_{Ld}(\theta)}{bC_L} \sin(n\theta) d\theta$$

and where $\omega(\theta)$ is the twist distribution. As can be observed, the twist distribution is calculated using numerous parameters, none of which are dependent upon the operating conditions, e.g., velocity, air density, air temperature, air pressure, etc. These parameters include wingspan, b, chord length distribution, $c(\theta)$, airfoil section lift slope, $\tilde{c}_{L,\alpha}$, the desired or target airfoil section lift coefficient distribution (typically, but not necessarily, the maximum lift coefficient distribution determined from the geometry of the wing), $\tilde{c}_{Ld}(\theta)$, and the lift coefficient, $C_L$. It should be noted that $\theta$ is equal to $\cos^{-1}(-2z/b)$ where z is a spanwise coordinate and b is the wingspan. The twist amount at the wingtips may be given by $$\Omega = [F(\pi/2) - F(0)] C_L$$

where $\Omega$ is the twist amount. The twist amount is observed to be proportional to the lift coefficient, $C_L$. It will be noted that $F(\pi/2)$ and $F(0)$ are constants. Thus, the above equation can be re-written as $$\Omega = x C_L$$

where x is a constant and $C_L$ is a lift coefficient of the wing.

As explained above, the wing lift coefficient, $C_L$, can vary widely over the allowable flight envelope and is dependent on the weight of the vehicle, air density, the surface area of the wing, and the airspeed or velocity of the vehicle. For this reason, it is advantageous to be able to vary the amount of wing twist interactively during flight in direct response to changes in the lift coefficient or any of its individual parameters, either separately or in combination.

During takeoff and landing of an aircraft, it is more important to maximize the lift than it is to reduce induced drag. If the maximum attainable airfoil section lift coefficient is constant across the span of the wing, to achieve the absolute maximum in the wing lift coefficient that is attained prior to the onset of stall, the section lift coefficient would need to be uniform over the wingspan. In the above twist distribution equation, it is mathematically quite simple to obtain the twist distribution for an unswept wing of any planform, which produces a uniform section lift coefficient. For example, for a wing with linear taper, this results in $$\frac{c(\theta)}{b} = \frac{2[1 - (1 - R_T)|\cos(\theta)|]}{R_A(1 + R_T)}$$

$$w_n = \begin{cases} 1/(\pi R_A), \; n = 1; \; 0, \; n \text{ even}; \\ \frac{c(\pi/2)}{\pi b} \left\{ \frac{1}{n} - \frac{1 - R_T}{n^2 - 1} [n + (-1)^{(n+1)/2}] \right\}, \; n > 1 \text{ odd} \end{cases}$$

$$\frac{\Omega \omega(\theta)}{C_L} = F(\pi/2) - F(\theta)$$

$$= \frac{4}{\pi R_A \tilde{C}_{L,\alpha}} \left\{ \frac{b}{c(\pi/2)} - \frac{b}{c(\theta)} \sin(\theta) \right\} -$$

$$\sum_{i=2}^{\infty} (-1)^i w_{2i-1} \left[ \frac{4b}{\tilde{C}_{L,\alpha} c(\pi/2)} + 2i - 1 \right] -$$

$$\sum_{i=2}^{\infty} w_{2i-1} \left\{ \frac{4b}{\tilde{C}_{L,\alpha} c(\theta)} + \frac{2i - 1}{\sin(\theta)} \right\} \sin[(2i - 1)\theta]$$

$$\frac{\Omega}{C_L} = F(\pi/2) - F(0)$$

$$= \frac{4b}{\pi R_A \tilde{C}_{L,\alpha} c(\pi/2)} - \sum_{i=2}^{\infty} w_{2i-1}$$

$$\left\{ (-1)^i \left[ \frac{4b}{\tilde{C}_{L,\alpha} c(\pi/2)} + 2i - 1 \right] + (2i - 1)^2 \right\}$$

In some instances, the twist distribution determined by the above equations is not practical because maintaining a uniform section lift coefficient over the entire span of the wing, from the root to the wingtips, requires to much twist in the region very close to the wingtips. To assure that the wing design is practical, some constraint must be placed on the wing. One way to accomplish this is to specify the wing twist over part of the wing and the section lift coefficient is specified over the remainder of the wing. To avoid excessive twist near the wingtips, the twist is specified over some wingtip region extending from the wingtip to some transition point. In one embodiment, the wingtip region is specified to be the outboard 5% of the wingspan. The exact form of the twist distribution used for the wingtip region is not critical and can be chosen on the basis of what is mechanically feasible. The remaining 90% of the wing will have a specified lift distribution, from which a twist distribution can be determined.

It should be noted that it is not necessary for the present disclosure that the maximum attainable airfoil section lift coefficient is constant across the span of the wing. For example, when trailing-edge flaps are deflected or the wing has some other type of aerodynamic twist, the maximum attainable airfoil section lift coefficient may vary with the spanwise coordinate. Because the present disclosure can be used to solve for the twist distribution that will produce any desired section lift coefficient distribution, the disclosure can be used to predict the twist distribution that will produce a target wing lift coefficient distribution for any wing geometry.

In one preferred embodiment, the maximum lift coefficient distribution of a wing is determined from the geometry of the wing. This may include determining a maximum airfoil section lift coefficient distribution. Such values are commonly determined for airfoils through either published information, computer simulation or experimentation. One of the most popular books for determining airfoil section properties is the Dover Publications classic: *Theory of Airfoil Sections* by Ira H. Abbott and Albert E. von Doenhoff (Abbott, Ira H.; and von Doenhoff, Albert E.: *Theory of Airfoil Sections*. Dover, 1949,1959) which is hereby incorporated by reference in its entirety. It should be noted that any method employed for determining the maximum airfoil section lift coefficient distribution falls within the scope of the present disclosure.

Next, using the equations provided herein, a twist distribution is determined to achieve the maximum lift coefficient distribution. A variable twist control system on a vehicle, such as any one of the kind disclosed herein, is then programmed with the twist distribution such that the system as able to implement the twist distribution in a wing. The variable twist control system is further programed to determine the twist amount from the operating conditions of the vehicle. While the vehicle is in operation, and at times when improved lift is desired or required, the variable twist control system implements the twist distribution on the wing of the vehicle. The control system further is able to calculate the twist amount during the operation of the vehicle and then dynamically adjusts the twist amount as the vehicle is in operation.

It should be noted that it is not required that the specified, desired or target airfoil section lift coefficient distribution be the maximum airfoil section lift coefficient distribution. Another distribution, other than the maximum airfoil section lift coefficient distribution, may be chosen. Further, it will be appreciated that, as used herein, the term "lift coefficient distribution" means the lift coefficient distribution and equivalent distributions, such as a lift distribution. The present disclosure is able to predict a twist distribution that will achieve any desired airfoil section lift coefficient distribution, whether the desired airfoil section lift coefficient distribution is expressed as an airfoil section lift coefficient distribution or an equivalent.

When the twist distribution is implemented into a wing, in the appropriate amount, the twist distribution will achieve and maintain the specified or desired distribution. If the specified or desired distribution is a maximum airfoil section lift coefficient distribution, then all along the span of the wing, the maximum lift will be generated, and no sections of the wing will be underutilized or in a stalled condition. Thus, it will be appreciated that all sections of the wing, to which the twist distribution is applied, will be contributing their maximum lift potential and will be fully utilized.

It should also be noted that it is not required that the specified or desired lift distribution be spanwise symmetric along the wing. For this reason, it will be appreciated that the method disclosed herein can be used to simultaneously control the lift and rolling moment produced by a wing. Furthermore, because an asymmetric lift distribution produces an asymmetric induced drag distribution along the span of a wing, it will be appreciated that the method disclosed herein can also be used to simultaneously control the lift and yawing moment produced by a wing. The term "moment" represents a force applied to a rotational system at a distance from an axis of rotation.

It will be observed from the above, that the twist distribution for improving lift or controlling the rolling and/or yawing moments is dependent upon many factors, including, the geometry of the wing, chord length, wingspan, and a ratio of the local airfoil section lift coefficient of the wing to the lift coefficient of the wing. The twist distribution to maximize the lift potential of a wing may be determined at the time of the design of the wing. For this reason, the twist distribution can be programmed into an on-board computer. The twist amount, on the other hand, is determined from the operating conditions and is adjusted as the operating conditions vary. The appropriate software programming to determine the twist amount may be loaded into a memory of an on-board computer. The software programming may incorporate techniques for solving the equations disclosed herein as is known to one having ordinary skill in the art. In this manner, the on-board computer is able to calculate, in real-time, the twist amount using the software programming and input from sensors. The sensors may report information on airspeed, vehicle weight, load factor, air density, air pressure, wing area, and air temperature.

In the FIGS. 3-25, there are shown various embodiments of a variable-twist systems for wings. Any of these variable-twist systems may be used to either reduce induced drag, maximize lift, or both. In one embodiment of the present disclosure, an aircraft employs a variable-twist system to both reduce induced drag and to improve lift during different phases of a flight. For example, during takeoff, an aircraft with a variable-twist system may employ a twist distribution to improve lift. Once the aircraft has achieved a cruising altitude, the same variable-twist system may be used to employ a twist distribution to reduce induced drag. During landing, the same aircraft may employ the same variable-twist system to again improve lift.

Figure 3:
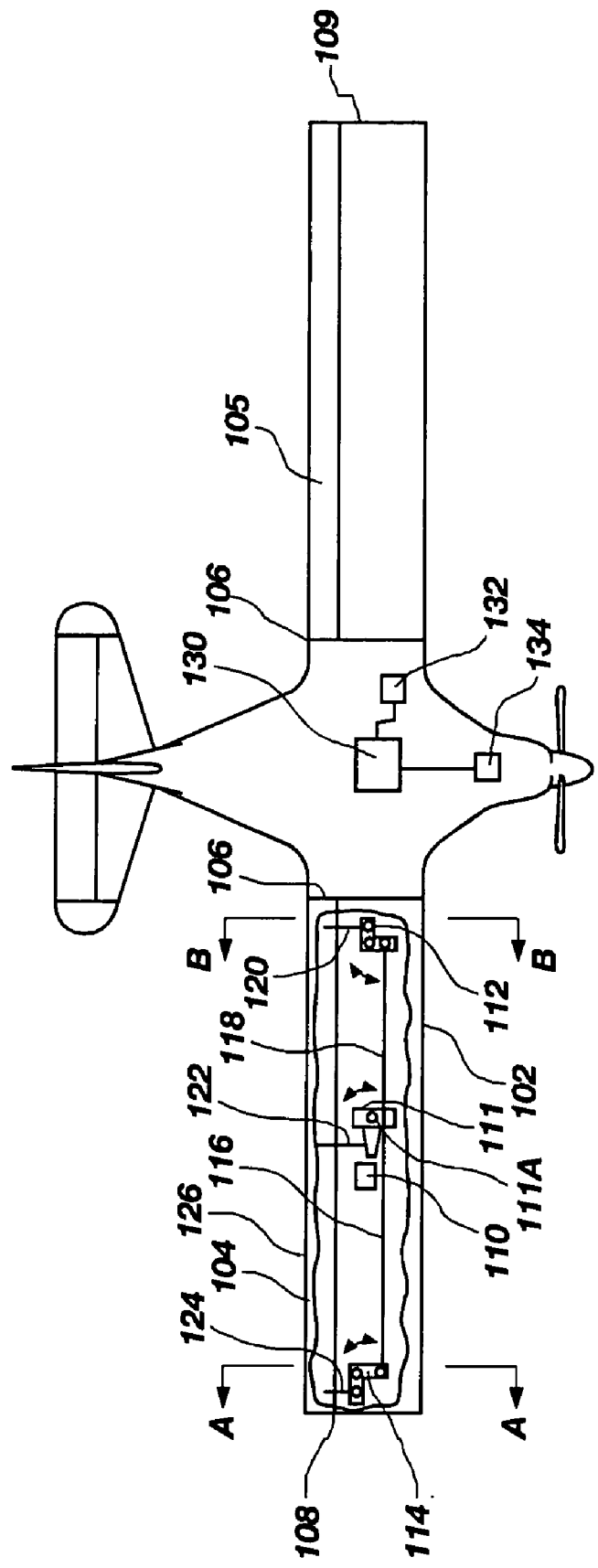
FIG. 3 is a plan view of an aircraft with part of a wing broken away to depict a control surface twisting mechanism.

FIG. 3 illustrates airplane 100 having employed onto its wing 102 one exemplary embodiment of the present disclosure. Each wing semispan has a full span deflecting control surface, 104 and 105, extending from about the root 106 to about the wing tips, 108 and 109, respectively. The control surfaces 104 and 105 on the wing may be used to simultaneously provide roll control, high-lift and minimum induced drag. The right wing semispan shows a break away view of an interior portion of the wing semispan.

Motor 110, such as a servo, hydraulic pump, or other drive means may be connected to arm 111. Motor 110 may rotate arm 111 in response to control signals from on board computer. Rod 122 may be connected to arm 111 attached to the wing 102 at a pivot point, 111A, can be pushed or pulled as the arm 111 may be rotated around the pivot point 111A, to deflect a portion of control surface 104. Linkages 116 and 118 couple arm 111 with arms 114 and 112, respectively. As arm 111 rotates, arms 114 and 112 also rotate around their respective pivot points (not indicated) to push or pull respective rods 124 and 120 to deflect respective portions of the control surface. It will be appreciated that a twist distribution, such as the optimum twist distribution, may be integrated into the design such that the control surface 104 deflection always comports to the twist distribution.

It will be appreciated that the greater the rotation of the motor 110, the more twist amount may be imparted to the control surface 104—which always has the same twist distribution. It will be further appreciated that while only three push/pull rods are shown, many more can be used to more closely approximate the twist distribution being sought.

On-board computer 130 may calculate a twist amount, such as the optimum twist amount and/or the twist amount required to maximize lift, based on operating conditions and send corresponding control signals to motor 110. On-board computer 130 may receive data from sensors 132 or gauges 134. The data may include one, some or all of the parameters needed to calculate the lift coefficient. The on-board computer 130 may continuously receive data and continuously send control signals to motor 110 such that the induced drag may be minimized through changing the twist amount on the control surface 104 and 105. Further, the on-board computer 130 may continuously receive data and continuously send control signals to motor 110 such the lift coefficient is maximized through changing the twist amount on the control surface 104 and 105.

The on-board computer 130 may sample the data at a predetermined rate. The control surfaces 104 and 105 may also be varied to input from the pilot received through the flight controls to control the airplane 100 in a conventional manner.

The on-board computer 130 may comprise a memory for storing information. Any previously calculated twist distribution may be stored in the memory. Further, any software programing required to calculate any of the values described herein may also be stored in the memory to be used by the on-board computer 130 when needed.

Figure 4:
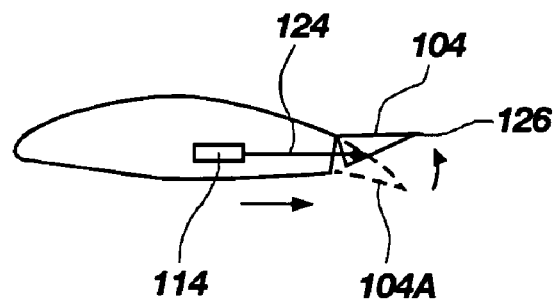
FIG. 4 is a cross-sectional view of the wing of FIG. 3 taken along line A-A.
Figure 5:
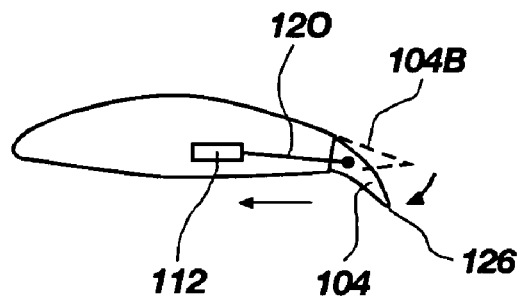
FIG. 5 is a cross-sectional view of the wing of FIG. 3 taken along line B-B.

FIGS. 4 and 5 illustrate how each of the rods 120, 122 and 124 "twists" the control surface 104. FIG. 4, taken along plane A-A in FIG. 3, shows that when rod 124 may be "pushed" by arm 114 with the appropriate rotation, the control surface 104 may be pushed up at that point compared to untwisted control surface 104A shown by the dashed lines. FIG. 5, taken along plane B-B of FIG. 3, shows that when rod 120 may be "pulled" by arm 112 with the appropriate rotation, the control surface 104 may be pulled downwards at that point compared to untwisted control surface 104B shown by the dashed lines. The combination of the various rods 124, 122 and 120 may be used to form a twist distribution along control surface 104 by similar pushing and pulling. Thus, the control surface 104 and 105 must be somewhat flexible such that they can be twisted pursuant to a twist distribution in the appropriate twist amount.

Figure 6:
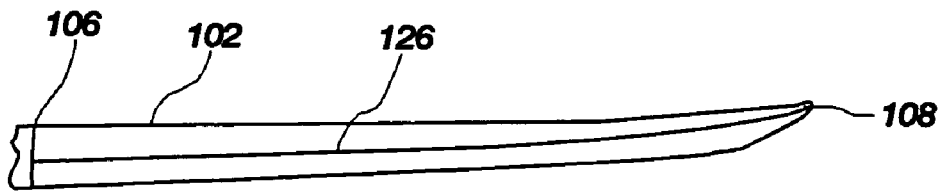
FIG. 6 is a rear view of a wing semispan of FIG. 3, illustrating one twist distribution of a spanwise control surface.

FIG. 6 is a rear view of the right semispan of wing 102 showing the trailing edge 126 twisted in accordance with a twist distribution. As can be observed, the control surface 104 has been deflected such that the trailing edge 126 may be distributed pursuant to a twist distribution from the root 106 to the tip 108. The trailing edge 106, the rearmost portion of control surface 104, may be noticeable higher at near the tip 108 as dictated by the optimum twist distribution formula and the corresponding graph in FIG. 2.

The wing twist defined by the equations outlined herein, can be used to maintain minimum induced drag or maximum lift over a range of operating conditions in plane 100 by employing full-span control surfaces 104 that can be twisted along their length to produce a continuous spanwise variation in zero-lift angle of attack (aerodynamic twist). The equations may also be used to achieve and maintain a specified distribution in a wing using the appropriate twist distribution applied in a twist amount. For a rectangular wing as wing 102, little twist may be required in the region near the root 106. Thus, the geometry shown in FIG. 7 can be used to approximate the aerodynamic twist needed to minimize induced drag or maximize lift. It is important to note that in practice, it may be difficult to obtain an optimum twist distribution or maximum lift in a wing due to mechanical limitations. These limitations may include weight, material, space and other design considerations. Thus, it is not a requirement of the present disclosure that a perfect optimum twist distribution or maximum lift twist distribution be applied to a wing, but that the distribution may be approximated as much as possible is sufficient to fall within the scope of the present disclosure as claimed.

Figure 7:
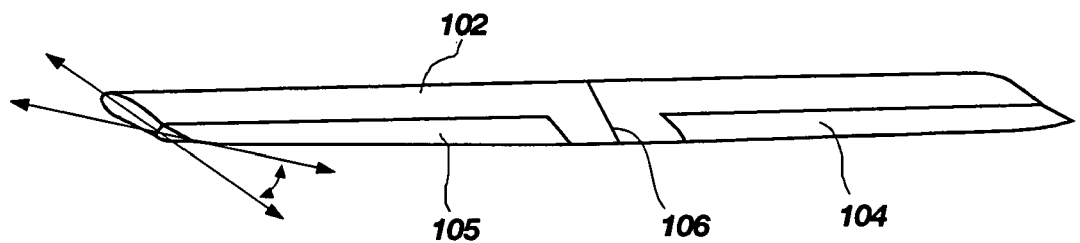
FIG. 7 is a perspective view of an exemplary embodiment of a wing having a control flap that has a washout to reduce induced drag, with no flap deflection.
Figure 8:
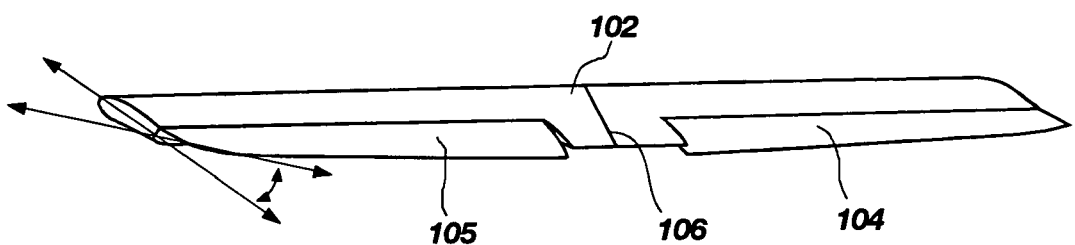
FIG. 8 is a perspective view of the wing of FIG. 7 in which the control flap has a 15 degree deflection and a washout to reduce induced drag.

By way of example, suppose the rectangular wing 102 shown in FIG. 3 has an aspect ratio of 6.0 with 30 percent trailing-edge flaps that provide a section flap effectiveness of 0.60. For an airfoil section lift slope of $2\pi$ and a lift coefficient of 0.60, the equations derived by applicant as well as the other equations disclosed herein require a spanwise elliptic washout distribution with 7.0 degrees of total washout at the wingtips. Since the section flap effectiveness is 0.60, this requires 11.6 degrees of elliptic flap twist, which is shown in FIG. 7. Similarly, a lift coefficient of 1.40 requires 27.1 degrees of elliptic flap twist, which is shown in FIG. 8 in combination with 15 degrees flap deflection. Thus, control surfaces 104 and 105 can be used to control roll, high-lift and to minimize induced drag.

It will be appreciated that it is not necessary for a twist distribution to reduce induce drag or maximize lift to be applied along the entire wing. For example, it is not necessary that the control surfaces 104 and 105 extend along the entire wingspan but may stop short of the fuselage of the airplane 100. Improved induced drag or maximized lift can be accomplished by varying the twist of only a portion of the wing during a flight. Again, limitations such as weight, material, space and other design considerations may take precedence.

Figure 9:
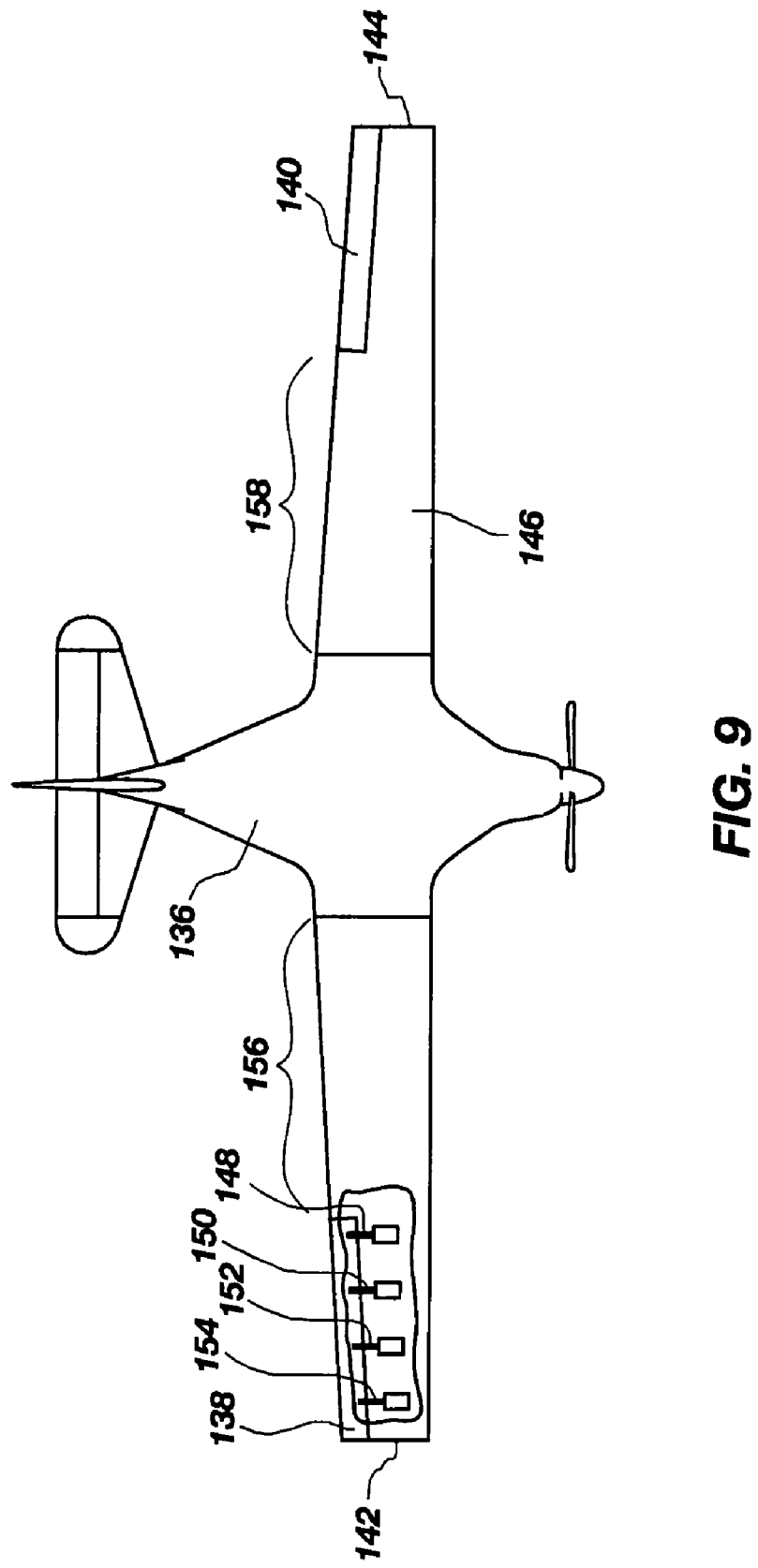
FIG. 9 is a plan view of an aircraft with part of a wing broken away to depict a control surface of a variable-twist control system.
Figure 10:
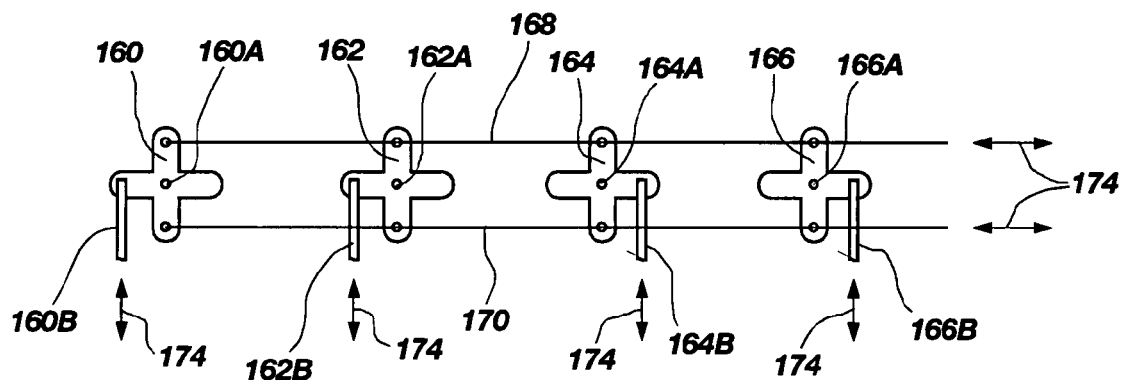
FIG. 10 is a break-away schematic view of one embodiment of a variable-twist control system for twisting a control surface using two control cords and push/pull arms.

A plane 136 having control surfaces 138 and 140, such as ailerons, located near the respective tips 142 and 144 of a tapered wing 146 is shown in FIG. 9. The right wing semispan has a breakaway portion exposing the part of the interior of wing 146. Rods 148, 150, 152, and 154 may be used to impart twist to control surface 138 in accordance with a twist distribution to reduce induced drag or to maximize lift. Similar rods (not shown) may twist control surface 140 accordingly. Portions 156 and 158 of wing 146 may not be twisted at all during flight. Improved induced drag and/or maximized lift will still be obtained for such a configuration as shown in FIG. 9. This may be partly due to the fact that for many wing taper ratios shown in the graph in FIG. 2, it can be observed that near the root section of the wing, the twist distribution may be minimal while at the tips the twist distribution may be much greater. Thus, twisting only a portion of a wing in accordance with a twist distribution is within the scope of the present disclosure. The same holds true for a wing having multiple control surfaces, such as flaps and ailerons, on each wing semispan.

FIGS. 10-15 each illustrate an additional method of implementing the push/pull rods to impart a twist distribution in a wing, examples of which were discussed in relation to FIGS. 3-9. Four cogwheels 160, 162, 164, and 166 rotate around pivot points 160A, 162A, 164A, and 166A, respectively. Control linkages 168 and 170 may be used to provide a torque to rotate cogwheels 160, 162, 164, and 166 in either direction as indicated by double arrows 172. Rods 160B, 162B, 164B, and 166B push or pull in the direction as shown by the double arrows marked with reference numeral 174 depending upon the direction in which the control linkages 168 and 170 are moved as well as which side of the respective pivot points (160A, 162A, 164A, and 166A) the rods 160B, 162B, 164B, and 166B are connected.

Figure 11:
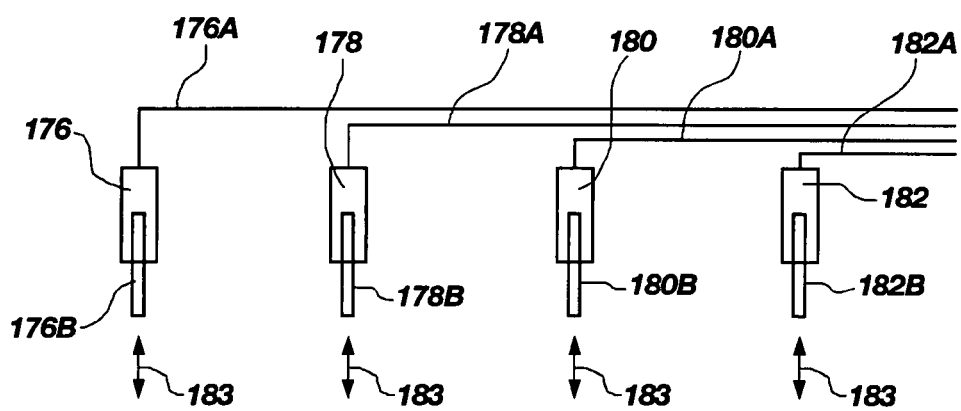
FIG. 11 is a break-away schematic view of a further embodiment of a variable-twist control system for twisting a control surface using hydraulic push/pull rods.

A hydraulic system as shown in FIG. 11 may also be used. Hydraulic lines 176A, 178A, 180A and 182A, connected to hydraulic cylinders, 176, 178, 180 and 182, respectively, and a pump (not shown), may be used to independently push or pull rods 176B, 178B, 180B and 182B to vary wing twist in the directions as shown by the double arrows marked with reference numeral 183.

FIG. 12 illustrates the use of control wires 184A, 186A, 188A and 190A to push or pull rods 184B, 186B, 188B, and 190B, each of the rods 184B, 186B, 188B, and 190B having a threaded end. Actuators 184, 186, 188, and 190 push or pull the respective rods 184B, 186B, 188B, and 190B in the direction indicated by double arrows 192 by engaging the threaded ends in accordance with signals received from the respective control wires 184A, 186A, 188A and 190A.

FIG. 13 illustrates the use of a shaft 194 having cams 196, 198, 200 and 202 spaced along its length. Each of cams 196, 198, 200 and 202 pushes against rods 196A, 198A, 200A and 202A, respectively, as the shaft 194 may be rotated. Springs 196B, 198B, 200B and 202B return rods 196A, 198A, 200A and 202A back to their original position or beyond, as the case may be. The cams 196, 198, 200 and 202 may be oriented differently to thereby produce varying push or pulls in the direction indicated by the double arrow marked with reference numeral 204. FIG. 14 illustrates a side view of cam 196, rod 196A and spring 196B, representative of the other cams, etc. As the cam 196 may be oblong in shape, rotating shaft 194 will either push rod 196A or allow spring 196B to pull rod 196A.

FIG. 15 illustrates another method to provide a push or pull force. Cam 206 may be mounted on shaft 208. Rod 206A may be permanently coupled to cam 206 by pin 207 mounted in groove 209. As shaft 208 rotates, rod 206A may be pushed or pulled.

Figure 16:
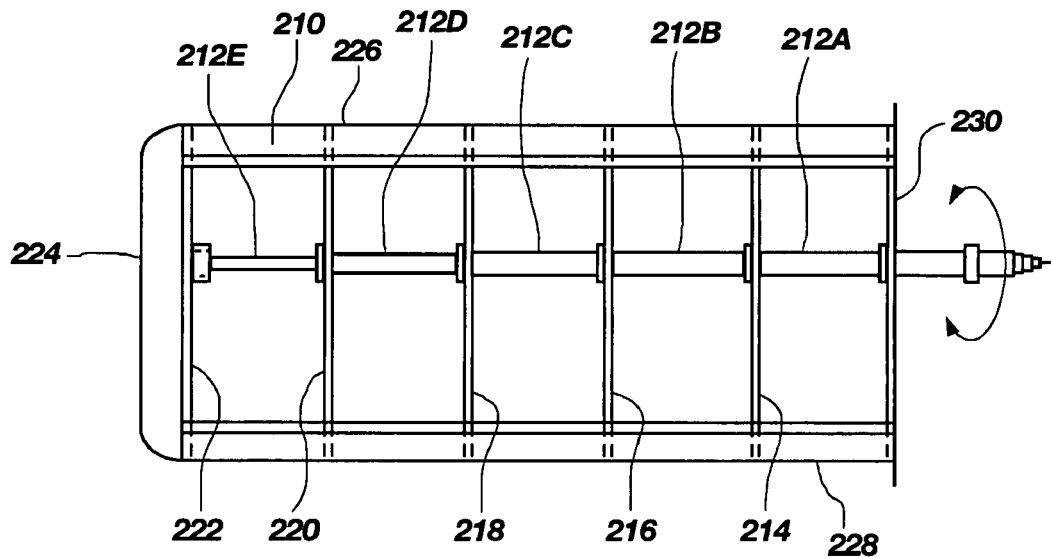
FIG. 16 is a break-away schematic plan view of a wing with a variable-twist control system by a plurality of shafts.
Figure 16A:
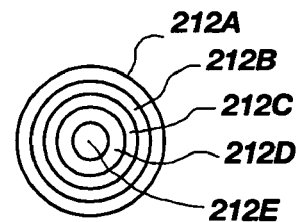
FIG. 16A is an end view of the plurality of shafts shown in FIG. 16 nestled one inside of the other.
Figure 17:
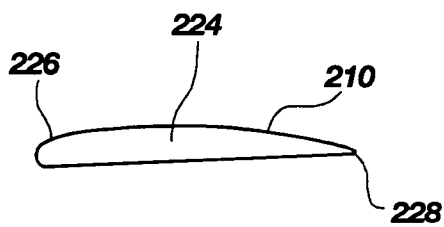
FIG. 17 is an end view of the wing of FIG. 16 in an un-twisted condition.
Figure 18:
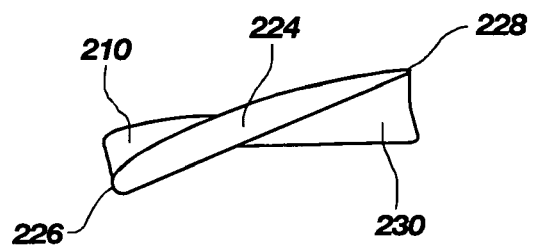
FIG. 18 is an end view of the wing of FIG. 16 in a twisted condition.

FIG. 16 illustrates an illustrative embodiment of a wing semispan 206 having a leading edge 226 and a trailing edge 228 capable of being twisted using pure geometric twist to obtain the optimum twist distribution pursuant to varying optimum twist amounts calculated during flight. A series of successively smaller shafts 212A, 212B, 212C, 212D and 212E extend from the wing root 230 into the wing 210. Shafts 212A, 212B, 212C, 212D each have a hollow interior thereby allowing the smaller diameter shafts to extend through it, as shown in FIG. 16A. One end of each of the shafts, 212A, 212B, 212C, 212D and 212E, may be attached to spars 214, 216, 218, 220, and 222, respectively. The opposite ends of shafts 212A, 212B, 212C, 212D and 212E may be independently rotated from the other shafts, both in direction and magnitude, in accordance with the twist distribution to thereby impart the desired twist in the wing. The twist amount may be varied in accordance with the twist distribution to maintain the required twist throughout the flight. FIG. 17 illustrates wing semispan 210 in an untwisted state. FIG. 18 illustrates wing semispan 210 in a twisted state using solely geometric twist by shafts 212A, 212B, 212C, 212D and 212E.

Figure 19:
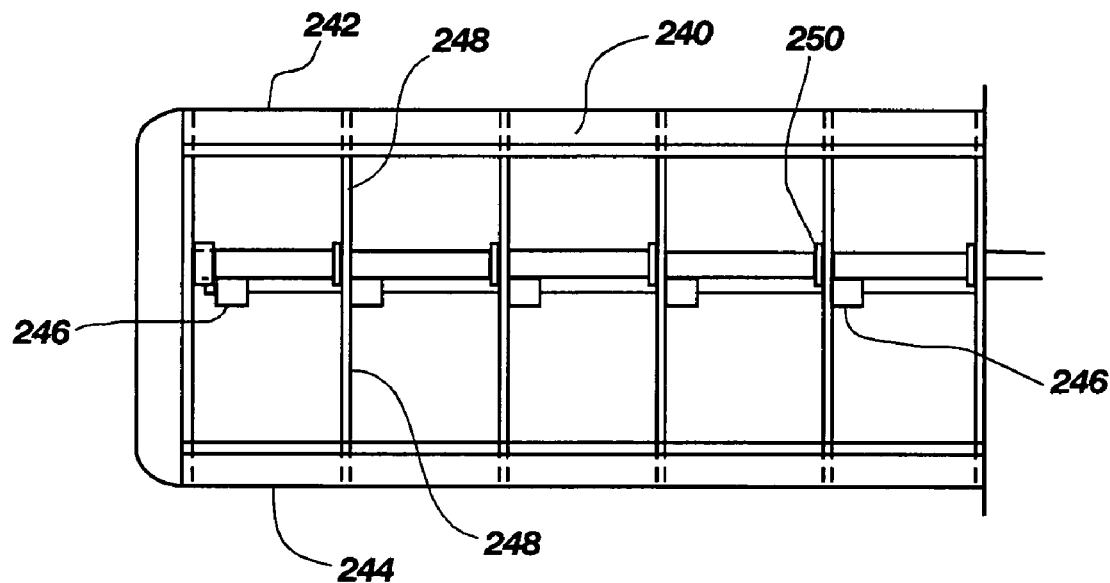
FIG. 19 is a break-away schematic plan view of a wing having a variable-twist control system that is twistable by a plurality of motors.
Figure 20:
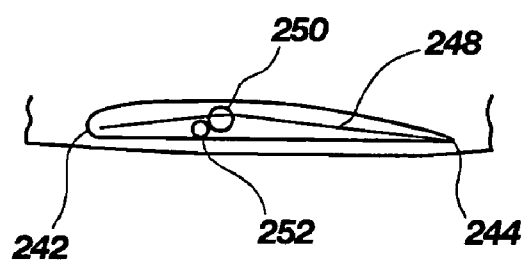
FIG. 20 is a cross-sectional view of the wing of FIG. 18 in an un-twisted condition.

FIG. 19 illustrates an alternative illustrative embodiment of a wing semispan 240 having a leading edge 242 and a trailing edge 244, also capable of being twisted using pure geometric twist similar to the embodiment of FIG. 16. The wing semispan 240 may have one or more motors 246 for imparting a rotational force to supports 248 to cause the wing semispan 240 to twist. As shown in FIG. 20, which shows a cross-sectional break-away view of the wing semispan 240 of FIG. 19, the supports 248 may be rigidly attached to rotation members 250. It will be understood that the rotation members 250 may include gears or wheels, for example, which may be driven by a rotational output member 252 of the motor 246. The output member 252 may also be configured as a gear configured to mesh with the rotation member 250 to transfer a rotational force from the output member 252 to the rotation member 250. Alternatively, the output member 252 may be in the form of a wheel for driving a belt to transfer a rotational force to the rotation member 250. It will be understood that any variety of mechanical torque transmitting devices may be used within the scope of the present disclosure to transfer a rotational force from the motor 246 to the rotating member 250. It will also be understood that any number of motors 246 may be used, and the motors 246 may be operated independently to vary the twist at a particular location.

Figure 21:
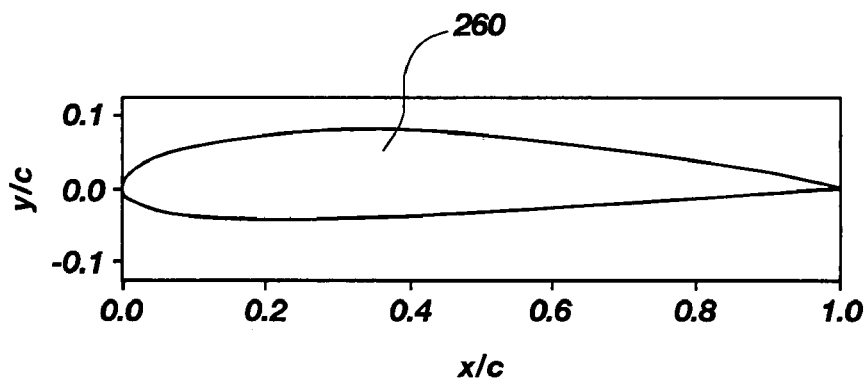
FIG. 21 is an airfoil cross section.

FIGS. 21-25 are illustrative examples of geometric twist and aerodynamic twist that may be employed to impart a twist distribution, either to reduce induced drag or maximize lift, to a wing in accordance with the principles of the present disclosure. In FIGS. 21-24, there is shown various airfoil sections imposed on a normalized y/c axis and an x/c axis. Referring now to FIG. 21, there is shown an example of a root airfoil cross-section 260 for a typical wing (in this example, the airfoil cross-section 260 has 2.0 percent camber, no geometric twist, and no flap twist).

Figure 22:
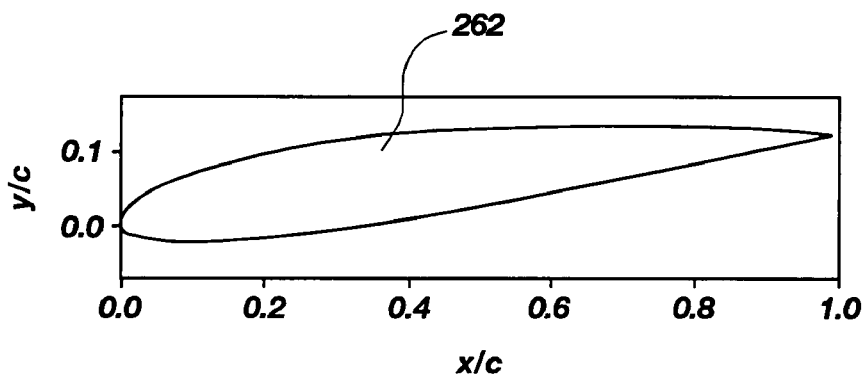
FIG. 22 is an airfoil cross section.
Figure 23:
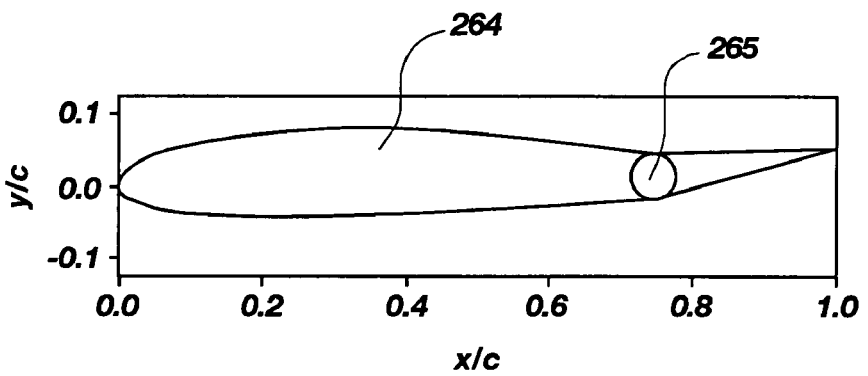
FIG. 23 is an airfoil cross section.
Figure 24:
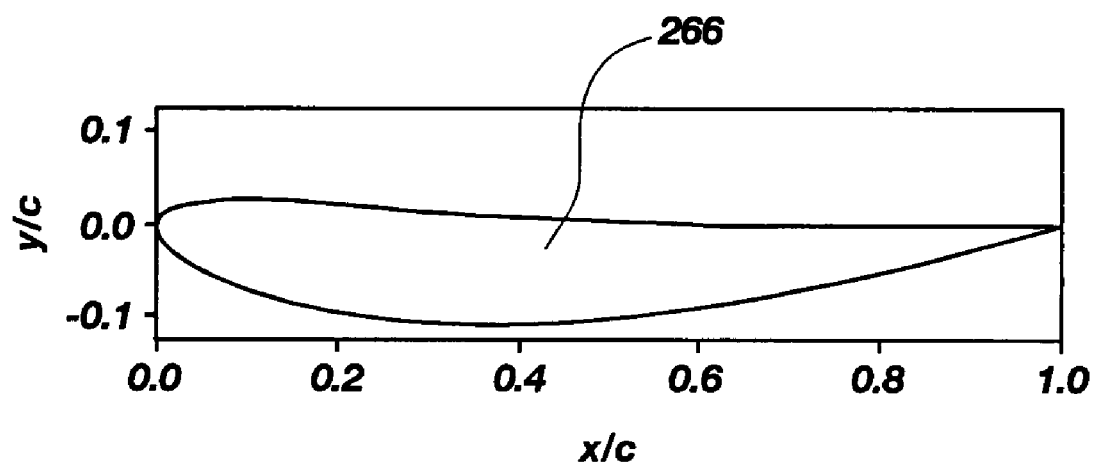
FIG. 24 is an airfoil cross section.
Figure 25:
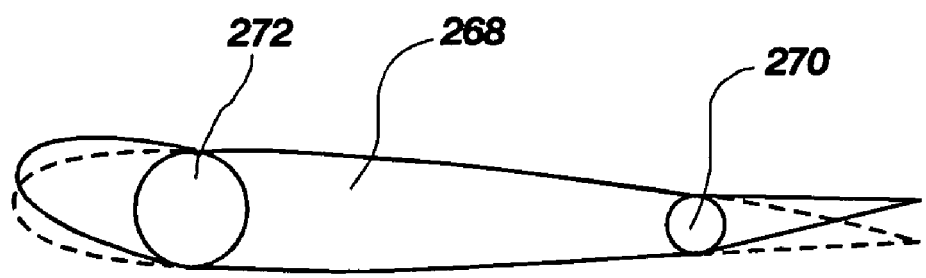
FIG. 25 is an airfoil cross section.

In FIG. 22, there is shown an example of an outboard airfoil cross-section 262 for a typical wing implementing geometric twist (in this example, the airfoil cross-section 262 is shown with 2.0 percent camber, no flap twist, and 7 degrees of geometric twist, relative to the airfoil cross-section shown in FIG. 21). In FIG. 23 there is shown an example of an outboard airfoil cross-section 264 for a typical wing implementing aerodynamic twist by means of trailing-edge flap twist (in this example, the airfoil cross-section 264 is shown with 2.0 percent camber, no geometric twist, and 11.6 degrees flap twist, which is equivalent to 7 degrees of geometric twist, relative to the airfoil cross-section shown in FIG. 21). In FIG. 24 there is shown an example of an outboard airfoil cross-section 266 for a typical wing implementing aerodynamic twist by means of camber-line deformation (in this example, the airfoil cross-section 266 is shown with no geometric twist, no flap twist, and −4.5 percent camber, which is equivalent to 7 degrees of geometric twist, relative to the airfoil cross-section shown in FIG. 21). In FIG. 25 there is shown an example of an outboard airfoil cross-section 268 for a typical wing implementing aerodynamic twist by means of camber-line deformation at two discrete hinge points 270 and 272.

Thus, the common factor in all aerodynamic twist is that the airfoil camber line is changed at one or more points between the leading and trailing edges of the outboard airfoil cross-sections. The example of aerodynamic twist that is shown in FIG. 23 has the camber line bent at a single hinge point 265, which in that example is the 75 percent chord (corresponding to a 25 percent flap fraction). It is also possible to bend the airfoil camber line at more than one discrete hinge point. For example, FIG. 25 shows an airfoil cross-section with the airfoil camber line bent at two discrete hinge points, 270 and 272. This concept is easily extended to an arbitrary number of hinge points located between the leading and trailing edges of the outboard airfoil cross-sections. The example of aerodynamic twist that is illustrated in FIG. 24 is simply the limiting case where the airfoil camber line is bent at an infinite number of points between the leading and trailing edges of the outboard airfoil cross-sections. Thus, it should be understood that the present disclosure may be implemented using either geometric or aerodynamic twist. Further, there is no requirement that an infinite number of hinge points be used, but instead it is to be understood that only a finite amount are required to achieve the wing twist necessary.

Figure 26:
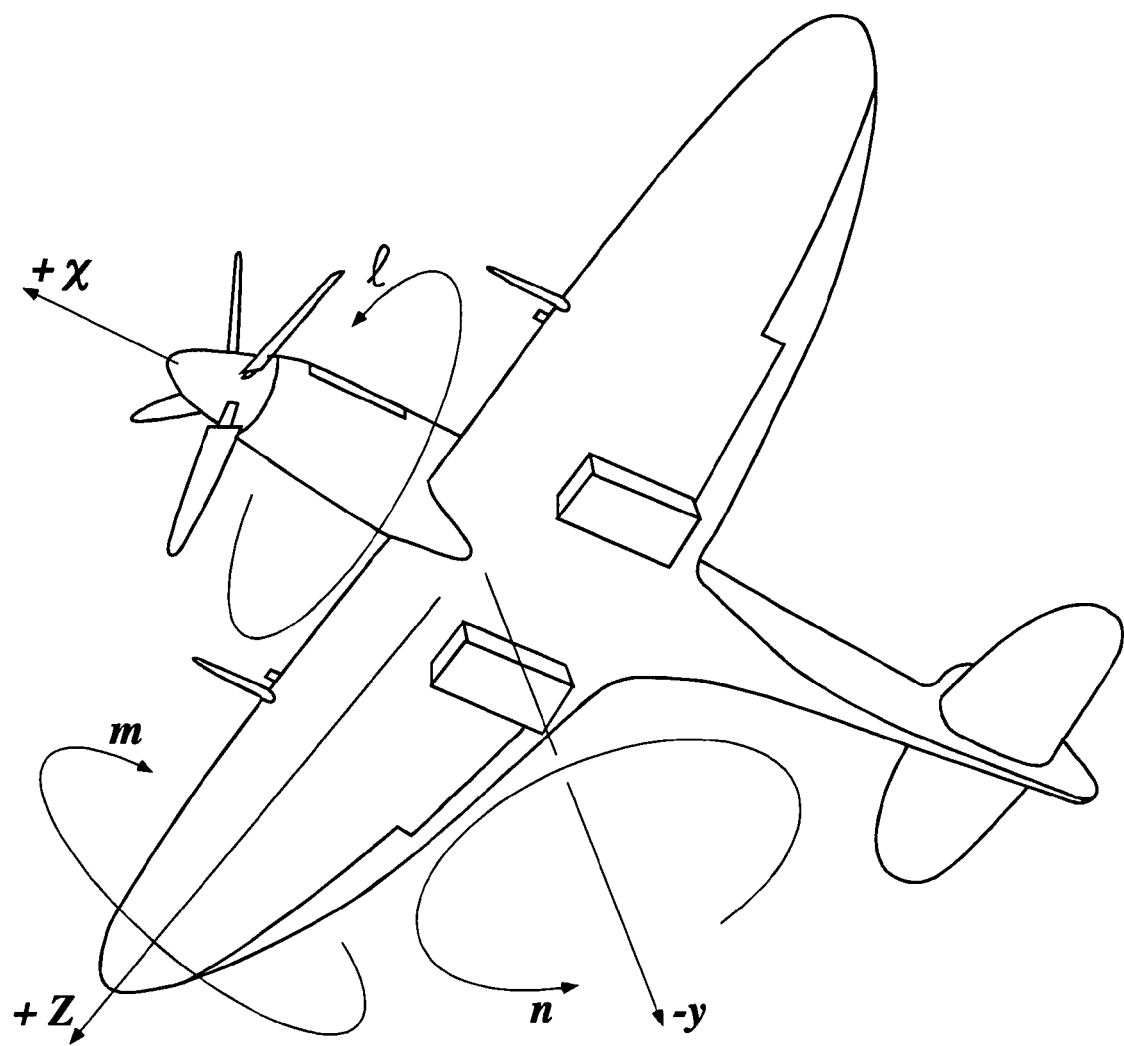
FIG. 26 depicts a coordinate system for an aircraft.

Referring now to FIG. 26, there is shown a depiction of an aircraft and a three-dimensional coordinate system, with each axis of this coordinate system being perpendicular to the other two axes. Using this coordinate system, one can define the orientation of the aircraft by the amount of rotation of the parts of the aircraft along these principal axes.

The x-axis, known as the roll axis, lies along the aircraft centerline. A roll motion is a rotation about the x-axis as is shown by the rotational arrow l. The y-axis, known as the yaw axis, is perpendicular to the wings in the vertical direction. A yaw motion is a rotation about the y-axis as is shown by the rotational arrow n. The z-axis, known as the pitch axis, is perpendicular to the aircraft centerline and lies in the plane of the wings. A pitch motion is a rotation about the z-axis as is shown by the rotational arrow m. As mentioned above, the present disclosure is able to control lift as well as the rolling moment and yawing moment produced by a wing by applying asymmetrical lift distributions to a wing.

In practice, embodiments of the present disclosure may take several forms due to the many known ways to implement wing twist using geometric or aerodynamic twist, some of which have been disclosed herein. Significantly, the present disclosure is not limited to the use of the mathematical formulas disclosed herein. Other twist distribution and twist amount formulas now known or known in the future may likewise fall under the present disclosure as long as they are used to vary wing twist during flight in order to minimize induced drag or maximize lift.

It will be appreciated that the structure and apparatus disclosed herein is merely one example of a means for determining an amount of twist, and it should be appreciated that any structure, apparatus or system for determining an amount of twist which performs functions the same as, or equivalent to, those disclosed herein are intended to fall within the scope of a means for determining an amount of twist, including those structures, apparatus or systems for determining an amount of twist which are presently known, or which may become available in the future. Anything which functions the same as, or equivalently to, a means for determining an amount of twist falls within the scope of this element.

It will be appreciated that the structure and apparatus disclosed herein is merely one example of a means for applying a twist, and it should be appreciated that any structure, apparatus or system for applying a twist which performs functions the same as, or equivalent to, those disclosed herein are intended to fall within the scope of a means for applying a twist, including those structures, apparatus or systems for applying a twist which are presently known, or which may become available in the future. Anything which functions the same as, or equivalently to, a means for applying a twist falls within the scope of this element.

Those having ordinary skill in the relevant art will appreciate the advantages provided by the features of the present disclosure. For example, it is a feature of the present disclosure to provide a method for varying the twist on a wing such that the induced drag can be minimized during flight for various operating conditions. Another feature of the present disclosure is to provide a method for varying the twist pursuant to an optimized twist distribution such that the induced drag is minimized to approximate the same minimum induced drag of an elliptic wing having the same aspect ratio. Another feature of the present invention is to provide a method for varying the twist in a wing responsive to one, some or all of the parameters defining the lift coefficient. Still another feature of the present invention is to provide a control system for varying the twist amount on a wing pursuant to a desired twist distribution. Another feature of the present disclosure it to predict and implement a twist distribution in a wing that will produce any lift distribution, including a lift distribution that maximizes lift. It is another feature of the present disclosure to provide a variable-twist system on an aircraft such that maximum lift can be obtained during takeoff and landing. It is another feature of the present disclosure to provide a variable-twist system to reduce induced drag at cruising altitude.

Those having ordinary skill in the relevant art will appreciate the advantages provided by the features of the present disclosure. In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment.

Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of improving lift generated by a wing of a vehicle, said method comprising the steps of specifying a target airfoil section lift coefficient distribution, and applying a twist distribution to the wing and thereby maintain an airfoil section lift coefficient distribution across at least a portion of the wing that either approximates or equals the target airfoil section lift coefficient distribution;

further comprising the step of determining the twist distribution based over an extended segment of the wing, at least in part, upon an equation, the equation being $$\omega(\theta) = \frac{F(\pi/2) - F(\theta)}{F(\pi/2) - F(0)}$$

where $$F(\theta) = \sum_{n=1}^{\infty} w_n \left[ \frac{4b}{\tilde{C}_{L,\alpha}c(\theta)} + \frac{n}{\sin(\theta)} \right] \sin(n\theta)$$

$$w_n = \frac{1}{2\pi} \int_{\theta=0}^{\pi} \frac{c(\theta)\tilde{C}_{Ld}(\theta)}{bC_L} \sin(n\theta)d\theta$$

and where $\omega(\theta)$ is the twist distribution, b is a wingspan, $\tilde{C}_{L,\alpha}$ is an airfoil section lift slope, $c(\theta)$ is a local airfoil section chord length at $\theta$, $\theta$ is equal to $\cos^{-1}(-2z/b)$ where z is a spanwise coordinate and b is a wingspan, $\tilde{C}_{Ld}(\theta)$ is the target airfoil section lift coefficient distribution that is to be produced over the wingspan, and $C_L$ is a lift coefficient of the wing.

2. The method of claim 1, further comprising the step of calculating a twist amount for the twist distribution.

3. The method of claim 2 further comprising the step of calculating a lift coefficient for the wing, and using the lift coefficient to calculate the twist amount for the twist distribution.

4. The method of claim 2, further comprising the step of determining a weight of the vehicle, and using the weight of the vehicle to calculate the twist amount for the twist distribution.

5. The method of claim 2, further comprising the step of determining a airspeed of the vehicle, and using the airspeed of the vehicle to calculate the twist amount for the twist distribution.

6. The method of claim 2, further comprising the step of determining an air density, and using the air density to calculate the twist amount for the twist distribution.

7. The method of claim 2, further comprising the step of determining an air temperature, and using the air temperature to calculate the twist amount for the twist distribution.

8. The method of claim 2 further comprising the step of determining an air pressure, and using the air pressure to calculate the twist amount for the twist distribution.

9. The method of claim 2 wherein the twist amount is calculated using an equation.

10. The method of claim 9 wherein the equation is $$\Omega = [F(\pi/2) - F(0)]C_L$$

where $F(\pi/2)$ and $F(0)$ are evaluated using $$F(\theta) = \sum_{n=1}^{\infty} w_n \left[ \frac{4b}{\tilde{C}_{L,\alpha}c(\theta)} + \frac{n}{\sin(\theta)} \right] \sin(n\theta)$$

$$w_n = \frac{1}{2\pi} \int_{\theta=0}^{\pi} \frac{c(\theta)\tilde{C}_{Ld}(\theta)}{bC_L} \sin(n\theta) d\theta$$

and where
$\Omega$ is the twist amount,
b is a wingspan,
$\tilde{C}_{L,\alpha}$ is an airfoil section lift slope,
$c(\theta)$ is a local airfoil section chord length at $\theta$,
$\theta$ is equal to $\cos^{-1}(-2z/b)$ where z is a spanwise coordinate and
b is a wingspan,
$\tilde{C}_{Ld}(\theta)$ is the target airfoil section lift coefficient distribution that is to be produced over the wingspan, and
$C_L$ is a lift coefficient of the wing.

11. The method of claim 2 further comprising the step of determining an area of the wing, and using the area of the wing to calculate the twist amount for the twist distribution.

12. The method of claim 1, further comprising the step of applying the twist distribution to the wing using a variable-twist control system.

13. The method of claim 1, further comprising the step of not applying the twist distribution to a wingtip region of the wing.

14. The method of claim 13, wherein the wing comprises a span, and the wingtip region is approximately five percent (5%) of the span of the wing.

15. The method of claim 1, further comprising the step of applying the twist distribution using aerodynamic twist.

16. The method of claim 1, further comprising the step of applying the twist distribution using geometric twist.

17. The method of claim 1, further comprising the step of applying the twist distribution using both aerodynamic twist and geometric twist.

18. The method of claim 1, wherein the vehicle is an aircraft.

19. The method of claim 18, further comprising the step of applying the twist distribution during takeoffs and landings of the aircraft.

20. The method of claim 1, wherein the specified airfoil section lift coefficient distribution is a uniform distribution.

21. A method of twisting a wing of a vehicle, said method comprising the steps of:
specifying a desired distribution for at least a portion of the wing;
determining a twist distribution to achieve the desired distribution;
applying the twist distribution to the at least a portion of the wing to thereby improve lift generated by the wing; and
determining the twist distribution using an equation wherein the equation being $$\omega(\theta) = \frac{F(\pi/2) - F(\theta)}{F(\pi/2) - F(0)}$$

where $$F(\theta) = \sum_{n=1}^{\infty} w_n \left[ \frac{4b}{\tilde{C}_{L,\alpha}c(\theta)} + \frac{n}{\sin(\theta)} \right] \sin(n\theta)$$

$$w_n = \frac{1}{2\pi} \int_{\theta=0}^{\pi} \frac{c(\theta)\tilde{C}_{Ld}(\theta)}{bC_L} \sin(n\theta) d\theta$$

and where
$\omega(\theta)$ is the twist distribution,
b is a wingspan,
$\tilde{C}_{L,\alpha}$ is an airfoil section lift slope,
$c(\theta)$ is a local airfoil section chord length at $\theta$,
$\theta$ is equal to $\cos^{-1}(-2z/b)$ where z is a spanwise coordinate and
b is a wingspan,
$\tilde{C}_{Ld}(\theta)$ is a target airfoil section lift coefficient distribution that is to be produced over the
wingspan, and
$C_L$ is a lift coefficient of the wing.

22. The method of claim 21 wherein the desired distribution is at least one of an airfoil section lift coefficient distribution and a lift distribution.

23. The method of claim 21 wherein the desired distribution is a maximum airfoil section lift coefficient distribution for the wing.

24. The method of claim 21 wherein the desired distribution is a uniform distribution across at least a portion of the wing.

25. The method of claim 21, further comprising the steps of calculating a twist amount for the twist distribution.

26. The method of claim 25 further comprising the step of calculating a lift coefficient for the wing, and using the lift coefficient to calculate the twist amount for the twist distribution.

27. The method of claim 25, further comprising the step of determining a weight of the vehicle, and using the weight of the vehicle to calculate the twist amount for the twist distribution.

28. The method of claim 25, further comprising the step of determining a airspeed of the vehicle / and using the airspeed of the vehicle to calculate the twist amount for the twist distribution.

29. The method of claim 25, further comprising the step of determining an air density, and using the air density to calculate the twist amount for the twist distribution.

30. The method of claim 25, further comprising the step of determining an air temperature, and using the air temperature to calculate the twist amount for the twist distribution.

31. The method of claim 25, further comprising the step of determining an air pressure, and using the air pressure to calculate the twist amount for the twist distribution.

32. The method of claim 25 wherein the twist amount is calculated using an equation.

33. The method of claim 32 wherein the equation is $$\Omega = [F(\pi/2) - F(0)]C_L$$

where $F(\pi/2)$ and $F(0)$ are evaluated using $$F(\theta) = \sum_{n=1}^{\infty} w_n \left[ \frac{4b}{\tilde{C}_{L,\alpha} c(\theta)} + \frac{n}{\sin(\theta)} \right] \sin(n\theta)$$

$$w_n = \frac{1}{2\pi} \int_{\theta=0}^{\pi} \frac{c(\theta)\tilde{C}_{Ld}(\theta)}{bC_L} \sin(n\theta) d\theta$$

and where
- $\Omega$ is the twist amount,
- b is a wingspan,
- $C_{L,\alpha}$ is an airfoil section lift slope,
- $c(\theta)$ is a local airfoil section chord length at $\theta$,
- $\theta$ is equal to $\cos^{-1}(-2z/b)$ where z is a spanwise coordinate and
- b is a wingspan,
- $C_{Ld}(\theta)$ is a target airfoil section lift coefficient distribution that is to be produced over the wingspan, and
- $C_L$ is a lift coefficient of the wing.

34. The method of claim 25, further comprising the step of determining an area of the wing, and using the area of the wing to calculate the twist amount for the twist distribution.

35. The method of claim 21, further comprising the step of applying the twist distribution to the wing using a variable-twist control system.

36. The method of claim 21, further comprising the step of not applying the twist distribution to a wingtip region of the wing.

37. The method of claim 36, wherein the wing comprises a span, and the wingtip region is approximately five percent (5%) of the span of the wing.

38. The method of claim 21, further comprising the step of applying the twist distribution using aerodynamic twist.

39. The method of claim 21, further comprising the step of applying the twist distribution using geometric twist.

40. The method of claim 21, further comprising the step of applying the twist distribution using a combination of both aerodynamic twist and geometric twist.

41. The method of claim 21, wherein the vehicle is an aircraft.

42. The method of claim 41, further comprising the step of applying the twist distribution during takeoffs and landings of the aircraft.

43. A method of twisting a wing of a vehicle according to a predetermined twist distribution, said method comprising the steps of: determining a twist amount; and applying the predetermined twist distribution in the twist amount to the wing to thereby improve lift generated by the wing wherein the twist amount is based upon an equation, the equation being $$\Omega = [F(\pi/2) - F(0)]C_L$$

where $F(\pi/2)$ and $F(0)$ are evaluated using the equations $$F(\theta) = \sum_{n=1}^{\infty} w_n \left[ \frac{4b}{\tilde{C}_{L,\alpha} c(\theta)} + \frac{n}{\sin(\theta)} \right] \sin(n\theta)$$

$$w_n = \frac{1}{2\pi} \int_{\theta=0}^{\pi} \frac{c(\theta)\tilde{C}_{Ld}(\theta)}{bC_L} \sin(n\theta) d\theta$$

and where
- $\Omega$ is the twist amount,
- b is a wingspan.
- $\tilde{C}_{L,\alpha}$ is an airfoil section lift slope,
- $c(\theta)$ is a local airfoil section chord length at $\theta$,
- $\theta$ is equal to $\cos^{-1}(-2z/b)$ where z is a spanwise coordinate and
- b is a wingspan, $\tilde{c}_{Ld}(\theta)$ is a target airfoil section lift coefficient distribution that is to be produced over the wingspan, and
- $C_L$ is a lift coefficient of the wing.

44. The method of claim 43, wherein the twist amount is proportional to a lift coefficient for the wing.

45. The method of claim 43, further comprising the steps of determining a weight of the vehicle and using the weight of the vehicle to determine the twist amount.

46. The method of claim 43, further comprising the steps of determining a lift coefficient of the wing and using the lift coefficient of the wing to determine the twist amount.

47. The method of claim 43, further comprising the step of determining a lift coefficient of the wing wherein the twist amount is equal to a constant multiplied by the lift coefficient.

48. The method of claim 43 further comprising the steps of determining airspeed of the vehicle and using the airspeed of the vehicle to determine the twist amount.

49. The method of claim 43 further comprising the steps of determining an air density and using the air density to determine the twist amount.

50. The method of claim 43 further comprising the steps of determining an air temperature and using the air temperature to determine the twist amount.

51. The method of claim 43 further comprising the steps of determining an air pressure and using the air pressure to determine the twist amount.

52. The method of claim 43, further comprising the step of applying the twist distribution to only a portion of the wing.

53. A method of improving lift generated by a wing of a vehicle, said method comprising the step of determining a twist distribution, applying a twist distribution to the wing to thereby maintain a specified airfoil section lift coefficient distribution across at least a portion of the wing;

the step of determining the twist distribution based, at least in part, upon an equation, the equation being $$\omega(\theta) = \frac{F(\pi/2) - F(\theta)}{F(\pi/2) - F(0)}$$

where $$F(\theta) = \sum_{n=1}^{\infty} w_n \left[ \frac{4b}{\tilde{C}_{L,\alpha} c(\theta)} + \frac{n}{\sin(\theta)} \right] \sin(n\theta)$$

$$w_n = \frac{1}{2\pi} \int_{\theta=0}^{\pi} \frac{c(\theta)\tilde{C}_{Ld}(\theta)}{bC_L} \sin(n\theta) d\theta$$

and where
- $\omega(\theta)$ is a twist distribution,
- b is a wingspan,
- $\tilde{C}_{L,\alpha}$ is an airfoil section lift slope,
- $c(\theta)$ is a local airfoil section chord length at $\theta$, θ is equal to $\cos^{-1}(-2z/b)$ where z is a spanwise coordinate and b is a wingspan, $\tilde{C}_{Ld}(\theta)$ airfoil section lift coefficient distribution that is to be produced over the wingspan, and $C_L$ is a lift coefficient of the wing.

54. A method of controlling movement of a vehicle having a wing, the vehicle having an axis, said method comprising the steps of:

specifying a target airfoil section lift coefficient distribution for the wing, said target airfoil section lift coefficient distribution being asymmetric; and applying a twist distribution to the wing and thereby maintain an airfoil section lift coefficient distribution across at least a portion of the wing that either approximates or equals the target airfoil section lift coefficient distribution;

wherein the twist distribution generates a moment to thereby cause a rotation of the vehicle around the axis determining the twist distribution based, at least in part, upon an equation, the equation being $$\omega(\theta) = \frac{F(\pi/2) - F(\theta)}{F(\pi/2) - F(0)}$$

where $$F(\theta) = \sum_{n=1}^{\infty} w_n \left[ \frac{4b}{\tilde{C}_{L,\alpha}c(\theta)} + \frac{n}{\sin(\theta)} \right] \sin(n\theta)$$

$$w_n = \frac{1}{2\pi} \int_{\theta=0}^{\pi} \frac{c(\theta)\tilde{C}_{Ld}(\theta)}{bC_L} \sin(n\theta) d\theta$$

and where $\omega(\theta)$ is a twist distribution, b is a wingspan, $\tilde{C}_{L,\alpha}$ is an airfoil section lift slope, $c(\theta)$ is a local airfoil section chord length at θ, θ is equal to $\cos^{-1}(-2z/b)$ where z is a spanwise coordinate and b is a wingspan, $\tilde{C}_{Ld}(\theta)$ is a target airfoil section lift coefficient distribution that is to be produced over the wingspan, and $C_L$ is a lift coefficient of the wing.

55. The method of claim 54, wherein the twist distribution generates a yawing moment.

56. The method of claim 54, wherein the twist distribution generates a rolling moment.

57. The method of claim 54, further comprising the step of calculating a twist amount for the twist distribution.

58. The method of claim 57, further comprising the step of calculating a lift coefficient for the wing, and using the lift coefficient to calculate the twist amount for the twist distribution.

59. The method of claim 57, further comprising the step of determining a weight of the vehicle, and using the weight of the vehicle to calculate the twist amount for the twist distribution.

60. The method of claim 57, further comprising the step of determining a airspeed of the vehicle, and using the airspeed of the vehicle to calculate the twist amount for the twist distribution.

61. The method of claim 57, further comprising the step of determining an air density, and using the air density to calculate the twist amount for the twist distribution.

62. The method of claim 57, further comprising the step of determining an air temperature, and using the air temperature to calculate the twist amount for the twist distribution.

63. The method of claim 57, further comprising the step of determining an air pressure, and using the air pressure to calculate the twist amount for the twist distribution.

64. The method of claim 57, wherein the twist amount is calculated using an equation.

65. The method of claim 64 wherein the equation is $$\Omega = [F(\pi/2) - F(0)]C_L$$

where $F(\pi/2)$ and $F(0)$ are evaluated using the equations $$F(\theta) = \sum_{n=1}^{\infty} w_n \left[ \frac{4b}{\tilde{C}_{L,\alpha}c(\theta)} + \frac{n}{\sin(\theta)} \right] \sin(n\theta)$$

$$w_n = \frac{1}{2\pi} \int_{\theta=0}^{\pi} \frac{c(\theta)\tilde{C}_{Ld}(\theta)}{bC_L} \sin(n\theta) d\theta$$

and where

Ω is a twist amount, b is a wingspan, $\tilde{C}_{L,\alpha}$ is an airfoil section lift slope, $c(\theta)$ is a local airfoil section chord length at θ, θ is equal to $\cos^{-1}(-2z/b)$ where z is a spanwise coordinate and b is a wingspan, $\tilde{C}_{Ld}(\theta)$ is a target airfoil section lift coefficient distribution that is to be produced over the wingspan, and $C_L$ is a lift coefficient of the wing.

66. A method of controlling movement of a vehicle having a wing the vehicle having a first axis and a second axis, said method comprising the steps of: generating a first moment to thereby cause a rotation of the vehicle around the first axis by determining twist distribution, applying a first twist distribution to the wing and thereby maintain an airfoil section lift coefficient distribution across at least a portion of the wing that either approximates or equals a first target airfoil section lift coefficient distribution the step of determining the twist distribution based, at least in part, upon an equation, the equation being $$\omega(\theta) = \frac{F(\pi/2) - F(\theta)}{F(\pi/2) - F(0)}$$

where $$F(\theta) = \sum_{n=1}^{\infty} w_n \left[ \frac{4b}{\tilde{C}_{L,\alpha}c(\theta)} + \frac{n}{\sin(\theta)} \right] \sin(n\theta)$$

$$w_n = \frac{1}{2\pi} \int_{\theta=0}^{\pi} \frac{c(\theta)\tilde{C}_{Ld}(\theta)}{bC_L} \sin(n\theta) d\theta$$

and where $\omega(\theta)$ is a twist distribution, b is a wingspan, $\tilde{C}_{L,\alpha}$ is an airfoil section lift slope, $c(\theta)$ is a local airfoil section chord length at θ, θ is equal to $\cos^{-1}(-2z/b)$ where z is a spanwise coordinate and b is a wingspan, $\tilde{C}_{Ld}(\theta)$ is a airfoil section lift coefficient distribution that is to be produced over the wingspan, and $C_L$ is a lift coefficient of the wing.

67. The method of claim 66, further comprising the step of generating a second moment to thereby cause a rotation of the vehicle around the second axis by applying a second twist distribution to the wing and thereby maintain an airfoil section lift coefficient distribution across at least a portion of the wing that either approximates or equals a second target airfoil section lift coefficient distribution.

68. The method of claim 67, further comprising the step of determining a twist amount for at least one of the first twist distribution and the second twist distribution.

69. The method of claim 68, further comprising the step of calculating a lift coefficient for the wing, and using the lift coefficient to calculate the twist amount for at least one of the first twist distribution and the second twist distribution.

70. The method of claim 68, further comprising the step of determining a weight of the vehicle, and using the weight of the vehicle to calculate the twist amount for at least one of the first twist distribution and the second twist distribution.

71. The method of claim 68, further comprising the step of determining a airspeed of the vehicle, and using the airspeed of the vehicle to calculate the twist amount for at least one of the first twist distribution and the second twist distribution.

72. The method of claim 68, further comprising the step of determining an air density, and using the air density to calculate the twist amount for at least one of the first twist distribution and the second twist distribution.

73. The method of claim 68, further comprising the step of determining an air temperature, and using the air temperature to calculate the twist amount for at least one of the first twist distribution and the second twist distribution.

74. The method of claim 68, further comprising the step of determining an air pressure, and using the air pressure to calculate the twist amount for at least one of the first twist distribution and the second twist distribution.

75. The method of claim 67, wherein the first moment is a yawing moment and the second moment is a rolling moment.

76. The method of claim 67, wherein the first and second target airfoil section lift coefficient distributions are asymmetric.

* * * * *